US012562452B2

(12) United States Patent
Yu et al.

(10) Patent No.: US 12,562,452 B2
(45) Date of Patent: Feb. 24, 2026

(54) ELECTRONIC DEVICE

(71) Applicant: Advanced Semiconductor Engineering, Inc., Kaohsiung (TW)

(72) Inventors: Yuanhao Yu, Kaohsiung (TW); Weifan Wu, Kaohsiung (TW); Yong-Chang Syu, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 176 days.

(21) Appl. No.: 18/228,616

(22) Filed: Jul. 31, 2023

(65) Prior Publication Data

US 2025/0046981 A1 Feb. 6, 2025

(51) Int. Cl.
*H01Q 1/22* (2006.01)
*H01Q 1/38* (2006.01)
*H01Q 21/00* (2006.01)

(52) U.S. Cl.
CPC ................. *H01Q 1/22* (2013.01); *H01Q 1/38* (2013.01); *H01Q 21/0006* (2013.01)

(58) Field of Classification Search
CPC ........ H01Q 1/22; H01Q 1/38; H01Q 21/0006; H01Q 1/2283
See application file for complete search history.

(56) References Cited

U.S. PATENT DOCUMENTS

| | | | | |
|---|---|---|---|---|
| 9,007,273 | B2 | 4/2015 | Liao et al. | |
| 10,530,038 | B2 * | 1/2020 | Hsu | H01Q 21/062 |
| 11,037,891 | B2 * | 6/2021 | Lin | H01L 21/4857 |
| 2017/0181287 | A1 * | 6/2017 | Jhang | H01Q 9/0407 |
| 2024/0363995 | A1 * | 10/2024 | Nie | H01Q 1/2283 |

* cited by examiner

*Primary Examiner* — Seung H Lee
(74) *Attorney, Agent, or Firm* — Foley & Lardner LLP

(57) ABSTRACT

The present disclosure provides an electronic device. The electronic device includes a circuit structure, an interconnection structure disposed over the circuit structure, and an antenna element disposed over the interconnection structure. The antenna element defines a first recess having a sidewall, and the sidewall of the first recess of the antenna element is configured to feed a signal to the antenna element and is electrically connected to the interconnection structure.

19 Claims, 35 Drawing Sheets

ELECTRONIC DEVICE

BACKGROUND

1. Technical Field

The present disclosure relates to an electronic device.

2. Description of the Related Art

Electronic device(s) using antennas for signal transmission (e.g., radio frequency (RF) signal) may include an antenna layer and a circuit layer electrically connected thereto. Conventionally, coupling member(s) may be coupled to the feeding point and/or the grounding point of the antenna layer. The coupling member requires an installation space, which may be a bottleneck for package minimization and production efficiency. In addition, the signal transmission through the coupling member may be unstable and may unintentionally affect the antenna performance.

SUMMARY

In some arrangements, an electronic device includes a circuit structure, an interconnection structure disposed over the circuit structure, and an antenna element disposed over the interconnection structure. The antenna element defines a first recess having a sidewall, and the sidewall of the first recess of the antenna element is configured to feed a signal to the antenna element and is electrically connected to the interconnection structure.

In some arrangements, an electronic device includes an antenna component including an antenna pattern, a package structure disposed under the antenna component, and a connection in contact with a sidewall of the antenna pattern and electrically connecting the antenna pattern and the package structure.

In some arrangements, an electronic device includes a package structure including an electronic component and an antenna component supported by the package structure. The antenna component at least partially covers a first lateral surface of the package structure and has an antenna pattern electrically connected to the electronic component.

BRIEF DESCRIPTION OF THE DRAWINGS

Aspects of some arrangements of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
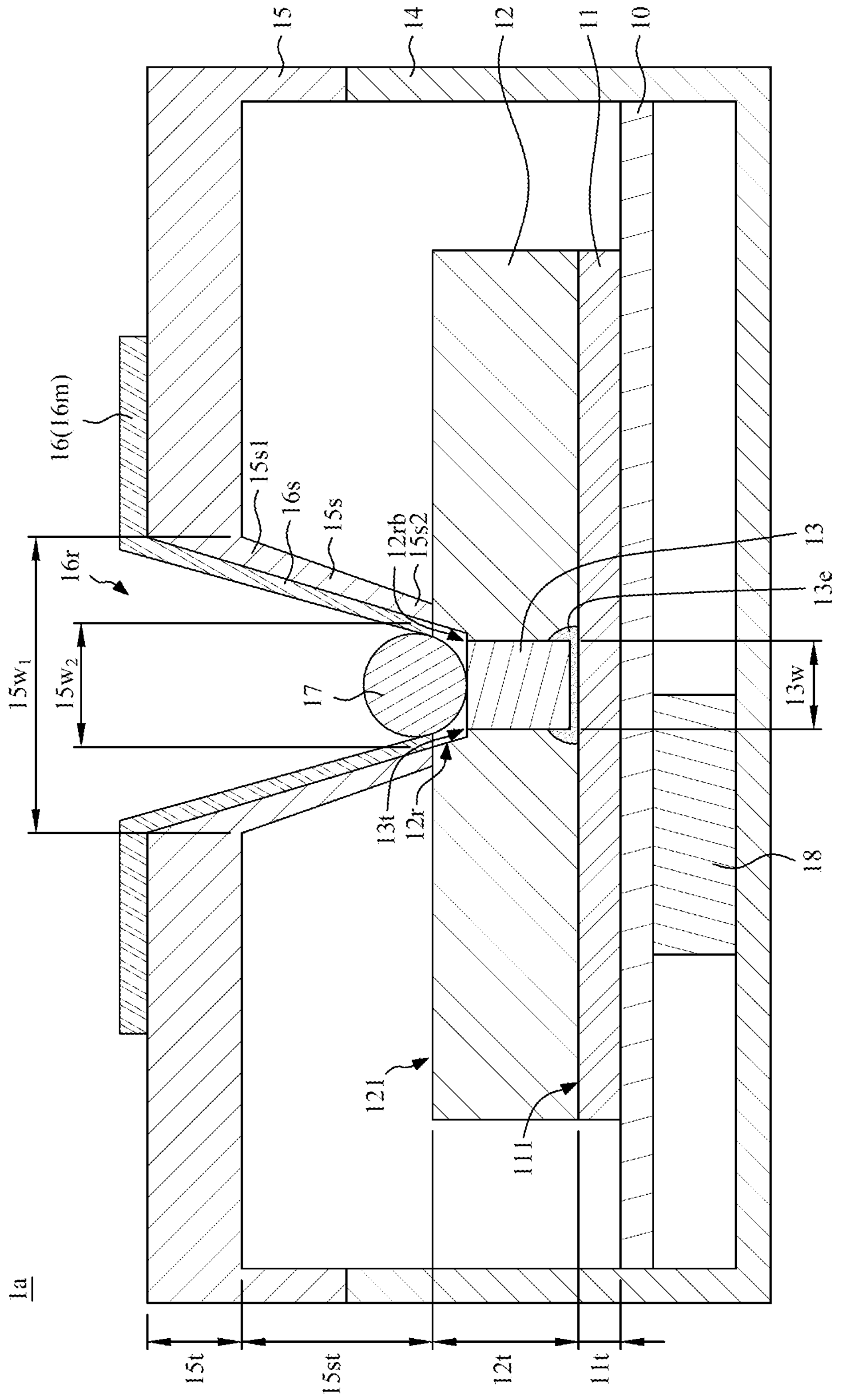
FIG. 1A illustrates a cross-sectional view of an electronic device in accordance with some arrangements of the present disclosure.

The following disclosure provides many different arrangements, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include arrangements in which the first and second features are formed or disposed in direct contact, and may also include arrangements in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of arrangements of this disclosure are not deviated from by such arrangement.

FIG. 1A illustrates a cross-sectional view of an electronic device 1*a* in accordance with some arrangements of the present disclosure. In some arrangements, the electronic device 1*a* may be or include, for example, an antenna device or an antenna package. In some arrangements, the electronic device 1*a* may include carriers 10, 11, an encapsulant 12, an interconnection structure 13, covers 14, 15, an antenna element 16, a bonding material 17, and a power source 18. The cover (which may also be referred to as a bottom cover, a carrier, or a bottom carrier) 14 and the cover (which may also be referred to as a top cover, a carrier, or a top carrier) 15 may collectively enclose the carriers 10, 11, the encapsulant 12, the interconnection structure 13, the bonding material 17, and the power source 18.

The carrier 10 may include a system board, a main board, or a printed circuit board (PCB). The carrier 10 may include a circuit structure or an interconnection structure, such as a redistribution layer (RDL), a circuit layer, a conductive trace, a conductive pad, a conductive via, etc.

The carrier 11 may include a substrate. For example, the carrier 11 may include a PCB, such as a paper-based copper foil laminate, a composite copper foil laminate, or a polymer-impregnated glass-fiber-based copper foil laminate. Similar to the carrier 10, the carrier 11 may include a circuit structure or an interconnection structure, such as a RDL. For example, the carrier 11 may have a surface 111 facing away from the carrier 10. The carrier 11 may include one or more conductive pads (not illustrated in the figures) in proximity to, adjacent to, or embedded in and exposed by the surface 111 of the carrier 11. The carrier 11 may include a dielectric layer (such as a solder resist, not illustrated in the figures) over the surface 111 of the carrier 11 to fully or partially expose at least a portion of the conductive pads for electrical connections of electronic components (such as the electronic component 20 and the electronic component 21 in FIG. 2K). In some arrangements, the carrier 11 may include or may be a circuit layer or a routing layer, such as a radio frequency (RF) routing layer. In some arrangements, the interconnection structure of the carrier 11 and the components mounted over the carrier 11 may include or may referred to as a component part of the electronic device 1*a*. The component part may be configured to feed signals (such as RF signals) to a radiation part (e.g., the antenna element 16) of the electronic device 1*a*.

In some arrangements, a dimension (such as a width, a length, a thickness, an area, etc.) of the carrier 10 may be greater than a dimension of the carrier 11.

In some arrangements, the carrier 10 and the carrier 11 may provide power routing paths (or power paths) for the components mounted over the carrier 11. For example, the carrier 10 may be configured to receive power from the power source 18. The carrier 10 and the carrier 11 may provide multiple power paths to electronic components (such as the electronic component 20 and the electronic component 21 in FIG. 2K).

The encapsulant 12 may be disposed over or on the surface 111 of the carrier 11. The encapsulant 12 may include insulation or dielectric material. In some arrangements, the encapsulant 12 may include an epoxy resin having fillers, a molding compound (e.g., an epoxy molding compound or other molding compound), a polyimide, a phenolic compound or material, a material with a silicone dispersed therein, or a combination thereof. The encapsulant 12 may have a lateral surface substantially coplanar with a lateral surface of the carrier 11. The encapsulant 12 may have a surface 121 facing away from the carrier 11. The encapsulant 12 may have an opening or recess 12*r* recessed from the surface 121. The recess 12*r* may have an inclined sidewall. For example, the recess 12*r* may taper toward the carrier 11. In some arrangements, the recess 12*r* may have a sidewall substantially perpendicular to the surface 111 of the carrier 11 (or the surface 121 of the encapsulant 12). The top surface (or an upper surface) 13*t* of the interconnection structure 13 may be a part of a base (or a bottom surface) 12*rb* of the recess 12*r*. The encapsulant 12 may have a thickness 12*t* ranging from about 0.6 millimeters (mm) to about 1.2 mm, such as 0.9 mm.

The interconnection structure 13 may be disposed over the surface 111 of the carrier 11. The interconnection structure 13 may include, but is not limited to, a conductive pillar, a bonding wire, a conductive via, stacked vias, etc. The interconnection structure 13 may be electrically connected with the carrier 11 through an electrical contact 13*e*. In some arrangements, the electrical contact 13*e* may include solder balls or solder bumps, such as a controlled collapse chip connection (C4) bump, a ball grid array (BGA) or a land grid array (LGA).

The interconnection structure 13 may be at least partially covered, encapsulated, or surrounded by the encapsulant 12. The interconnection structure 13 may extend through the encapsulant 12. The interconnection structure 13 may extend from the surface 111 of the carrier 11 to the recess 12*r*. The top surface 13*t* of the interconnection structure 13 may be at least partially exposed from the recess 12*r*. In some arrangements, the top surface 13*t* of the interconnection structure 13 may be entirely exposed from the recess 12*r*. In some arrangements, a surface area of the top surface 13*t* of the interconnection structure 13 may be less than a surface area of the base (or the bottom surface) 12*rb* of the recess 12*r*. In some arrangements, a surface area of the top surface 13*t* of the interconnection structure 13 may be substantially equal to a surface area of the base 12*rb* of the recess 12*r*. In some arrangements, the bottom surface of the interconnection structure 13 may contact (such as directly contact) the surface 111 of the carrier 11 and/or the electrical contact 13*e*.

In some arrangements, a length (such as the shortest distance between the top surface 13*t* and the bottom surface thereof) of the interconnection structure 13 along a direction substantially perpendicular to the surface 111 of the carrier 11 may be less than the thickness 12*t* of the encapsulant 12, such as less than 0.9 mm. In some arrangements, a width 13*w* (or a diameter) of the interconnection structure 13 may range from about 0.2 mm to about 0.8 mm, such as about 0.3 mm, about 0.4 mm, about 0.5 mm, about 0.6 mm, about 0.7 mm.

The cover 14 may have a base and a sidewall extending from the base. The base may contact or accommodate the power source 18 and the sidewall may contact the carrier 10. The cover 15 may be detachable from the cover 14. The cover 15 may be attached, removed, and reattached with respect to the cover 14. The cover 15 may be attached to the cover 14 through a mechanical or magnetic means. The mechanical or magnetic means may prevent unintended separation of the cover 14 and the cover 15. The mechanical or magnetic means may include locking elements, fastening elements, retaining elements, etc. More specifically, the mechanical or magnetic means may include a pin, a post, a spring, a plugger, a buffer, a snap, a clip, a contour, etc.

The cover 15 may include a compound, such as a liquid crystal compound. For example, the cover 15 may include a compound having a liquid crystal base, such as a liquid crystal polymer (LCP). The cover 15 may withstand temperatures up to 260 degrees Celsius or higher. The cover 15 may have a dielectric constant (Dk) between about 2 and 6. The cover 15 may have a dissipation factor (Df) between about 0 and 0.009.

In some arrangements, the cover 15 may include an epoxy resin, a thermoplastic polyurethane (TPU), soda-lime-silica glass, alkali-aluminosilicate glass, liquid silicone rubber (LSR), polycarbonate (PC), nylon, polybutylene terephthalate (PBT), etc. The cover 14 may have substantially the same material and/or characteristic as the cover 15. In some arrangements, the cover 14 and the cover 15 may have different materials and/or different characteristics.

The cover 15 may have a main portion (or main body) and an extension 15*s* extending from the main portion toward the encapsulant 12. The main portion may include a planar structure and have a thickness 15*t*. The main portion may include a sidewall contacting the sidewall of the cover 14. The main portion may be spaced apart from the encapsulant 12. The main portion may not contact the encapsulant 12. The main portion may define an air cavity (or an air space) over the encapsulant 12. The encapsulant 12 may not be covered by the cover 15. The encapsulant 12 may not be in contact with the main portion, but may be in contact with the extension 15*s*.

The extension 15*s* may extend between the main portion and the surface 121 of the encapsulant 12. The extension 15*s* may contact the surface 121 of the encapsulant 12, as shown in FIG. 1A. However, in some arrangements, the extension 15*s* may be spaced apart from the surface 121 of the encapsulant 12. The extension 15*s* may not contact the surface 121 of the encapsulant 12. The cover 15 may have an opening or recess (indicated by the arrow of the recess 16*r* of the antenna element 16) recessed from the main portion. The recess of the cover 15 and the recess 16*r* of the antenna element 16 may be of different subjects, and constitute a single recess 16*r*, since the antenna element 16 may be conformally disposed over the cover 15.

The extension 15*s* may be or define a sidewall of the recess of the cover 15. The sidewall of the recess defined by the extension 15*s* may taper toward the encapsulant 12. For example, the sidewall of the recess defined by the extension 15*s* may have an end (which may also be referred to as a first end) 15*s*1 proximal to (or connected to) the main portion and an end (which may also be referred to as a second end) 15*s*2 distal from the main portion. In a cross-sectional view, the end 15*s*1 may define an opening (which may also be referred to as a first opening) having a width (which may also be referred to as a first width) 15*w* and the end 15*s*2 may define an opening (which may also be referred to as a second opening) having a width (which may also be referred to as a second width) 15$w_2$ smaller than the width 15$w_1$. For example, the width 15$w_1$ of the opening defined by the end 15*s*1 may be the greatest width or diameter of the recess. For example, the width 15$w_2$ of the opening defined by the end 15*s*2 may be the smallest width or diameter of the recess. In some arrangements, the tapered structure of the sidewall of the recess defined by the extension 15*s* may be beneficial to the welding operation (as shown in FIG. 2K) since the bonding material 17 can more easily to climb onto the extension 15*s*. Also, the tapered structure may be beneficial for the plating of the antenna element 16 (as shown in FIG. 4E).

Figure 3:
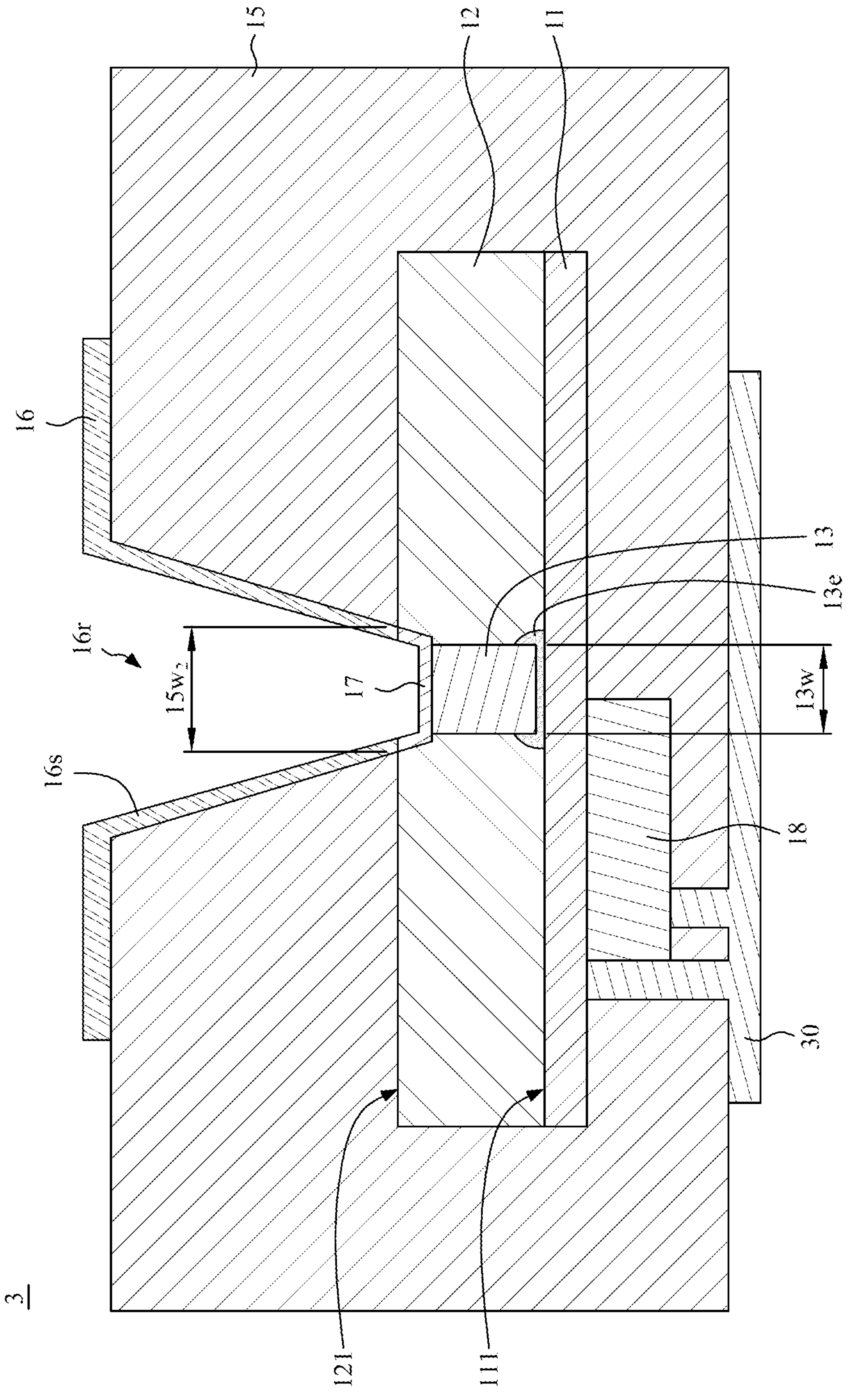
FIG. 3 illustrates a cross-sectional view of an electronic device in accordance with some arrangements of the present disclosure.
Figure 5:
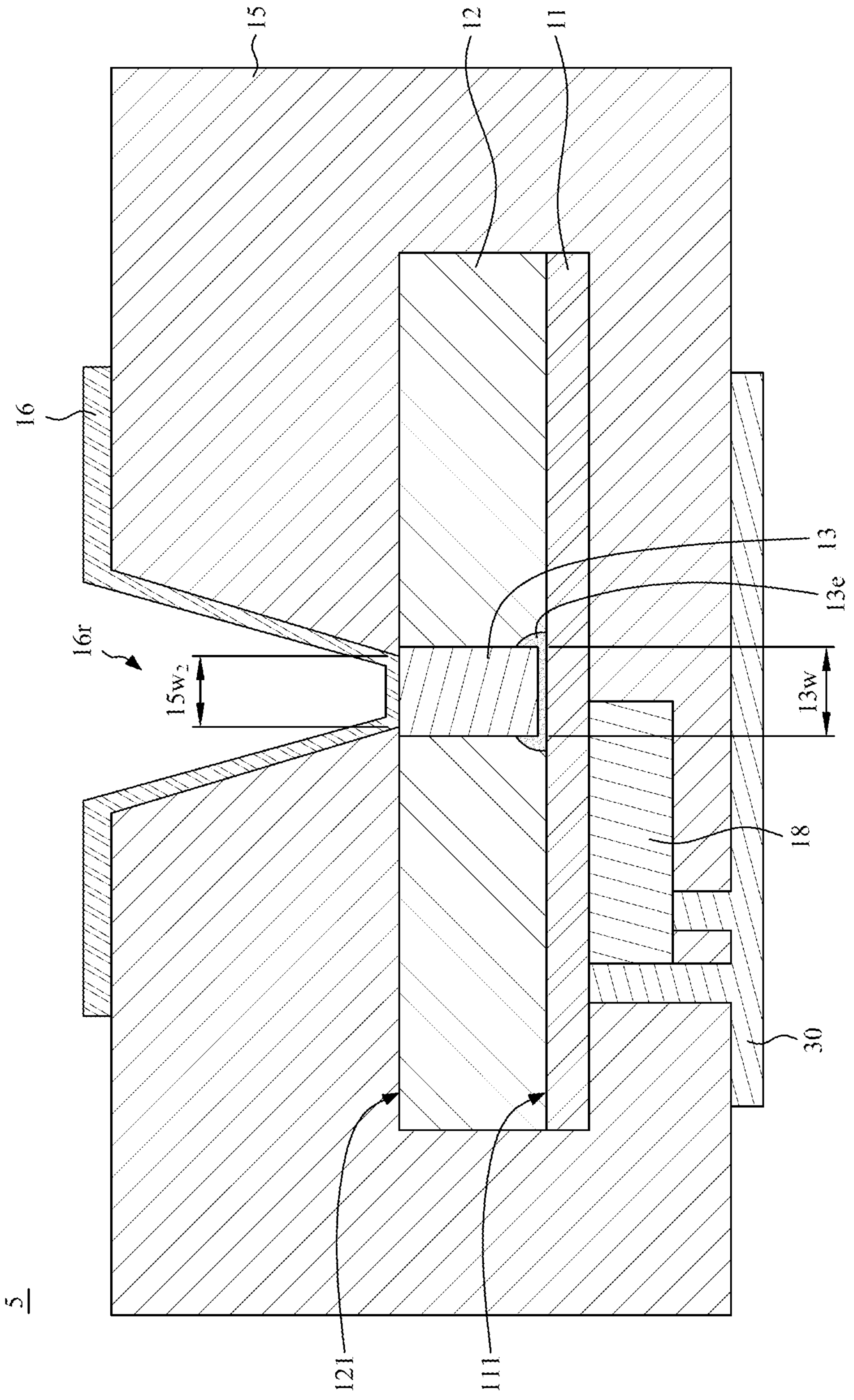
FIG. 5 illustrates a cross-sectional view of an electronic device in accordance with some arrangements of the present disclosure.

In some arrangements, the width 15$w_2$ may be substantially equal to the width 13*w* of the interconnection structure 13. In some arrangements, the width 15*w*2 may be greater than the width 13*w* of the interconnection structure 13 (as shown in FIG. 3). In some arrangements, the width 15$w_2$ may be smaller than the width 13*w* of the interconnection structure 13 (as shown in FIG. 5).

The main portion of the cover 15 may have the thickness 15*t* ranging from about 0.5 mm to about 1.1 mm, such as 0.8 mm. A distance (e.g., the shortest distance) 15st between the main portion and the surface 121 of the encapsulant 12 may range from about 1.1 mm to about 1.7 mm, such as 1.4 mm. As stated, the main portion may define an air cavity over the encapsulant 12, and a dimension of the air cavity may range from about 1.1 mm to about 1.7 mm, such as 1.4 mm. The extension 15*s* may be disposed or located in the air cavity.

The antenna element 16 may be disposed over or on the cover 15. The antenna element 16 may be configured to radiate and/or receive electromagnetic (EM) signals, such as radio frequency (RF) signals. The antenna element 16 may include an antenna array or an antenna pattern. The antenna element 16 may be of any suitable type, such as patch antennas, slot-coupled antennas, stacked patches, dipoles, monopoles, etc., and may have different orientations and/or polarizations.

The antenna element 16 may include an ultra-wideband antenna. In a simulated result of S11 (dB) versus frequency of the antenna element 16, the range/band of frequencies for which the reflection is very low (less than 10% of the fed signal, i.e., −10 dB) is approximately 7.86 GHz and 8.06 GHz.

The antenna element 16 may include a conductive material such as a metal or metal alloy. Examples of the conductive material include gold (Au), silver (Ag), copper (Cu), platinum (Pt), Palladium (Pd), other metal(s) or alloy(s), or a combination of two or more thereof.

The antenna element 16 may be supported by the cover 15. The antenna element 16 may be conformally disposed over the main portion and the extension 15*s* of the cover 15. The antenna element 16 and the cover 15 may be supported by the encapsulant 12. Since the antenna element 16 is supported by the cover 15, the cover 15 including the antenna element 16 can be considered as an antenna component. On the other hand, the other elements (such as the carriers 10, 11, the encapsulant 12, the interconnection structure 13, the bonding material 17, the power source 18, and the electronic component 20 and the electronic component 21 in FIG. 2K) can be considered as a package structure.

The antenna element 16 may have a main portion (or main body or a base portion) 16*m* disposed over or on the cover 15 and an extension 16*s* extending from the main portion 16*m* toward the encapsulant 12. The main portion may include a planar structure. The main portion 16*m* of the antenna element 16 may be disposed over or on the main portion of the cover 15.

The extension 16*s* may be disposed over or on the sidewall of the recess defined by the extension 15*s*. The extension 16*s* may extend between the main portion 16*m* of the antenna element 16 and the surface 121 of the encapsulant 12. The extension 16*s* may extend along the sidewall of the recess defined by the extension 15*s*, as shown in FIG. 1A. However, in some arrangements, the extension 16*s* may not extend along the sidewall of the recess defined by the extension 15*s*. The antenna element 16 may have the opening or recess 16*r* recessed from the main portion 16*m* of the antenna element 16.

The extension 16*s* may be or define a sidewall of the recess 16*r*. The sidewall of the recess 16*r* defined by the extension 16*s* may taper toward the encapsulant 12. In some arrangements, the extension 16*s* may include or function as a transmission line (e.g., a coaxial cable, a bifilar line, a waveguide, etc.). For example, the interconnection structure 13 may be electrically connected to the antenna element 16 through the extension 16*s* and the bonding material 17.

The extension 16*s* and the bonding material 17 may be configured to feed RF signals into the antenna element 16. In some arrangements, the RF signals may be generated from the electronic components (such as the electronic component 20 and the electronic component 21 in FIG. 2K) and/or a feed network (not shown in the figures).

In some arrangements, the carrier 10 may include a grounding element (not shown in the figures), such as a reference layer, a ground layer or a ground plane. The ground layer may be configured to ground the antenna element 16. In some arrangements, the ground layer may be configured to provide a return path for the RF signals and reduce signal noise.

In some arrangements, the space between the main portion of the cover 15 and the carrier 10 may serve as a resonant cavity. For example, the EM waves radiated or transmitted by the antenna element 16 may resonate in the resonant cavity. In some arrangements, the main portion may define an air cavity over the encapsulant 12, and the air cavity may be a part of the resonant cavity.

In some arrangements, a distance (e.g., the shortest distance, a sum of the distance 15st, the thickness 12*t*, and a thickness 11*t*) between the main portion of the cover 15 and the carrier 10 may be about a quarter of a wavelength of the EM waves radiated by the antenna element 16.

The bonding material 17 may be disposed in the recess 12*r* of the encapsulant 12. The bonding material 17 may at least partially protrude from the surface 121 of the encapsulant 12. The bonding material 17 may be at least partially surrounded by the extension 15*s* and/or the extension 16*s*. The bonding material 17 may include a reflowable material or a soldering material. In some arrangements, the bonding material 17 may include gallium (Ga), indium (In), tin (Sn), bismuth (Bi), or other suitable materials. The reflowable temperature of the bonding material 17 may be about 260 degrees Celsius or higher.

The power source 18 may be disposed over or on the carrier 10. The power source 18 may include a battery. In some arrangements, the power source 18 may be configured to provide power signals (or power) to the electronic components (such as the electronic component 20 and the electronic component 21 in FIG. 2K). In some arrangements, the number and the location of the power source can be adjusted according to design requirements, such as cost, dimension, ease of maintenance, etc. For example, the covers 14 and 15 can be opened to replace the power source 18.

Figure 1B:
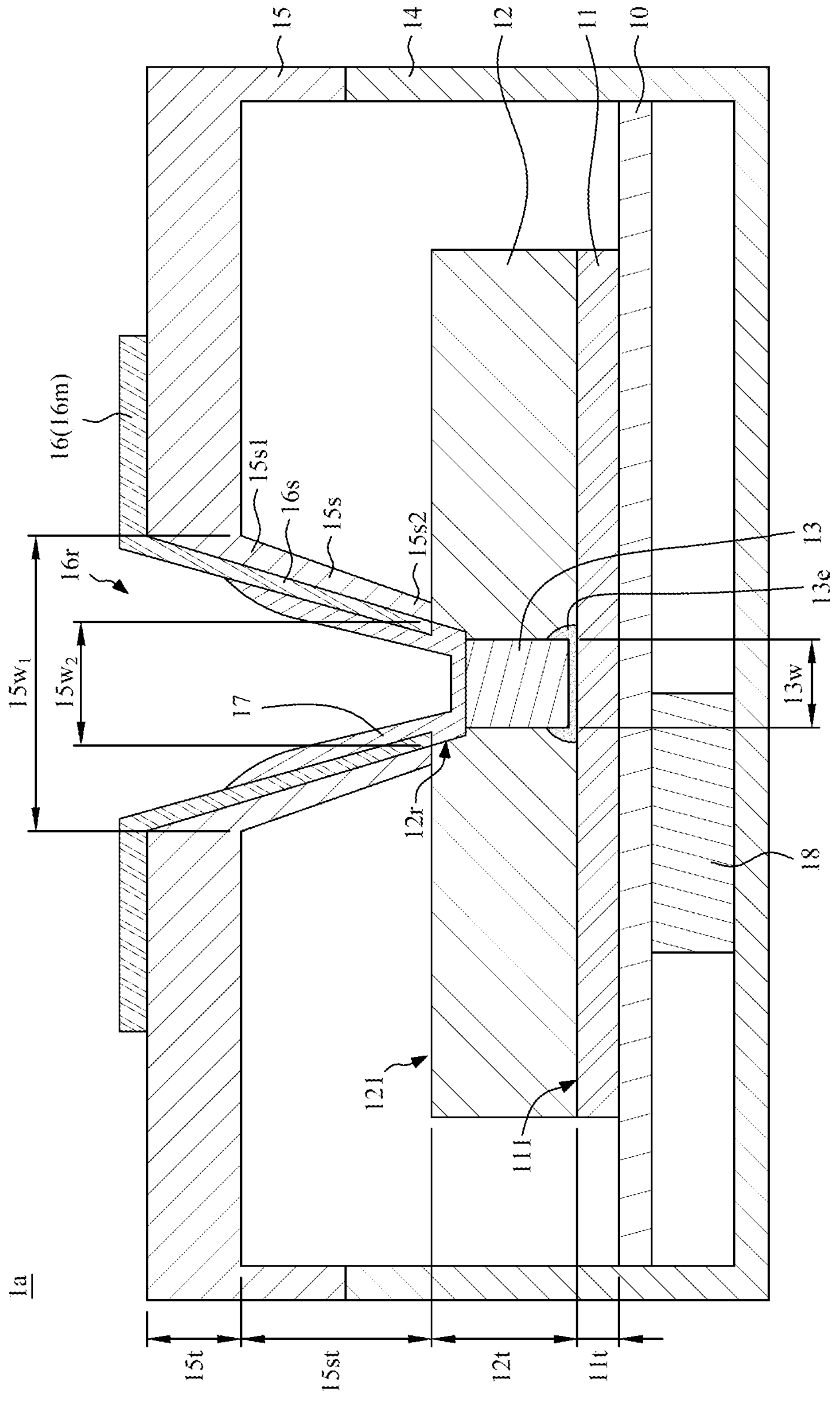
FIG. 1B illustrates a cross-sectional view of an electronic device in accordance with some arrangements of the present disclosure.

FIG. 1B illustrates a cross-sectional view of the electronic device 1*a* after the bonding material 17 is reflowed or melted. The interconnection structure 13 and the extension 16*s* of the antenna element 16 are connected through the bonding material 17.

In some arrangements, when the reflowable temperature (may be about 260 degrees Celsius or higher) of the bonding material 17 is reached, the bonding material 17 can be softened, liquefied, or become flowable and may climb/flow onto the extension 16*s* of the antenna element 16 (e.g., into the recess 16*r* defined by the extension 16*s*).

In some arrangements, the bonding material 17 may be connected with the extension 16*s* of the antenna element 16, forming a bonding structure or a bonding element. In some arrangements, the bonding material 17 may provide a connection between the extension 16*s* of the antenna element 16 and the interconnection structure 13. In some arrangements, the bonding material 17 may wet with the extension 16*s* of the antenna element 16 and maintain contact with the extension 16*s* of the antenna element 16. The bonding material 17 may be supported by the cover 15. The bonding material 17 may be supported by the antenna element 16. The antenna element 16 and the bonding material 17 may be conformally disposed over the main portion and the extension 15*s* of the cover 15. The antenna element 16 and the bonding material 17 may be conformally disposed over the top surface (or upper surface, as indicated in FIG. 1A) of the interconnection structure 13.

In some arrangements, the bonding structure may have a curved lateral surface from a cross sectional view due to surface tension demonstrated by the reflowable material of the bonding material 17 at the reflowable temperature. In some arrangements, the bonding material 17 may completely or partially fill the recess 16*r* defined by the extension 16*s*, depending on the amount of the bonding material 17. In some arrangements, the bonding material 17 may be in contact with a lower part (or a lower surface) of the extension 16*s*.

Figure 1C:
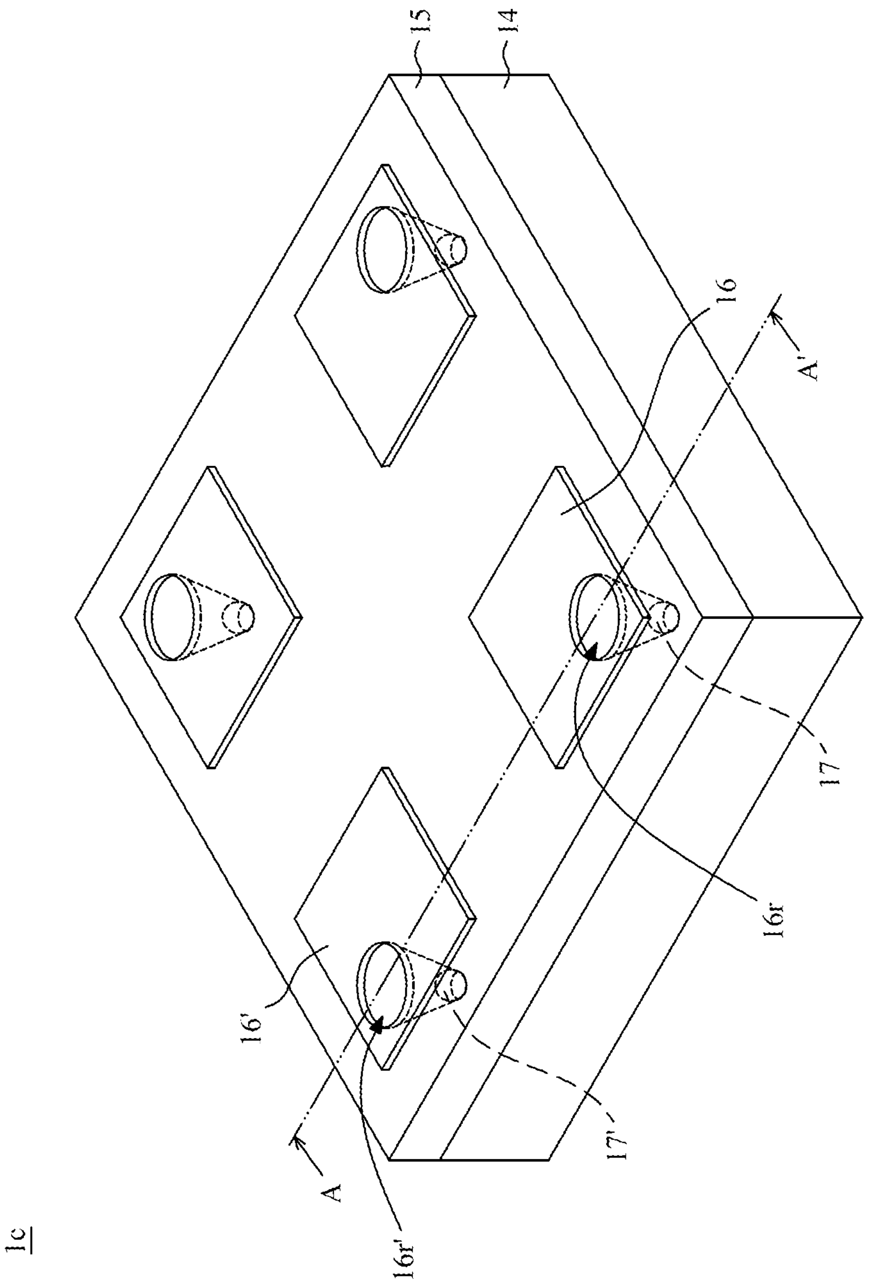
FIG. 1C illustrates a perspective view of an electronic device in accordance with some arrangements of the present disclosure.

FIG. 1C illustrates a perspective view of an electronic device 1*c* in accordance with some arrangements of the present disclosure. The same or similar elements between FIG. 1A and FIG. 1C may use the same reference numerals and/or letters and are not repeated hereinafter for conciseness.

In some arrangements, the electronic device 1*c* may be or include, for example, a wireless device, such as a user equipment (UE), a mobile station, a mobile device, an apparatus communicating with the Internet of Things (IoT), a target sensor, and others. The electronic device 1*c* may be configured in applications including, but not limited to, data collecting, locating, tracking, etc.

The electronic device 1*c* may include a plurality of antenna elements including the antenna elements 16 and 16'. The antenna elements may each have a recess, such as the recesses 16*r* and 16*r*'. Bonding materials 17 and 17' (before the welding operation in FIG. 2K) may be exposed from the recesses 16*r* and 16*r*'. The recesses may be arranged at the farthest points to avoid EM interference. For example, the recesses may be arranged at the farthest points to prevent the antenna elements from interfering with each other.

In some arrangements, the antenna elements may have different frequencies (or operating frequencies) or bandwidths (or operating bandwidths). For example, the antenna elements may be configured to radiate EM waves of different frequencies or different bandwidths. For example, the antenna element 16 may have an operating frequency higher than an operating frequency of the antenna element 16', or vice versa. For example, the antenna element 16 may be operated at a frequency of about 39 GHZ, and the antenna element 16' may be operated at a frequency of about 28 GHz, or vice versa.

In some arrangements, the antenna elements may each include a plate or a board shape. The antenna elements may each include a rectangular shape. However, the antenna elements may each include other shapes, such as a circle, an oval, a triangle, a quadrangle, a polygon, etc. The shape, location, and number of the antenna elements in FIG. 1C are for illustrative purposes only, and not intended to limit the present disclosure. The more antennas there are, the more accurate the location is.

In a comparative arrangement, a coupling member may be coupled to the feeding point and/or the grounding point of the antenna layer. The coupling member requires an installation space, which may be a bottleneck for package minimization and production efficiency. In addition, the signal transmission through the coupling member may be unstable and may unintentionally affect the antenna performance.

According to some arrangements of the present disclosure, by using the bonding material 17 to couple the radiating part (e.g., an antenna component including the antenna element 16) and the circuitry part (e.g., the other elements (such as the carriers 10, 11, the encapsulant 12, the interconnection structure 13, the bonding material 17, the power source 18, and the electronic component 20 and the electronic component 21 in FIG. 2K) considered as a package structure), no coupling member is needed and the manufacturing cost is lower. The size of the electronic device 1*c* along the x/y axis (e.g., parallel to the surface 111 of the carrier 11 in FIG. 1A) can be reduced.

Furthermore, an air cavity between the main portion of the cover 15 and the encapsulant 12 can serve as a resonant cavity. The air cavity has a relatively lower dielectric constant (Dk) than the encapsulant 12. The signal transmission loss of the electronic device 1*c* can be mitigated, and the antenna gain of the electronic device 1*c* can be increased.

FIGS. 2A, 2B, 2C, 2D, 2E, 2F, 2G, 2H, 2I, 2J, and 2K are cross-sections of one or more stages of a method of manufacturing an electronic device in accordance with some arrangements of the present disclosure. In some arrangements, the electronic device 1*c* in FIG. 1C may be manufactured by the following operations with respect to FIGS. 2A, 2B, 2C, 2D, 2E, 2F, 2G, 2H, 2I, 2J, and 2K. In some arrangements, the cross-sections are cross-sections of FIG. 1C through line AA'.

Figure 2A:
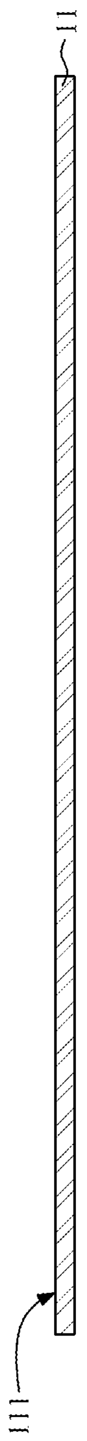
FIGS. 2A, 2B, 2C, 2D, 2E, 2F, 2G, 2H, 2I, 2J, and 2K are cross-sections of one or more stages of a method of manufacturing an electronic device in accordance with some arrangements of the present disclosure.

Referring to FIG. 2A, the carrier 11 is provided. In some arrangements, the carrier 11 may include a copper clad laminate (CCL) substrate that includes several carrier units, wherein one may be separable from another by a scribe line (not shown). Since each of the carrier units is subjected to similar or identical processes in the manufacturing method, for convenience, only one exemplary carrier unit is illustrated in the cross-sectional views.

Figure 2B:
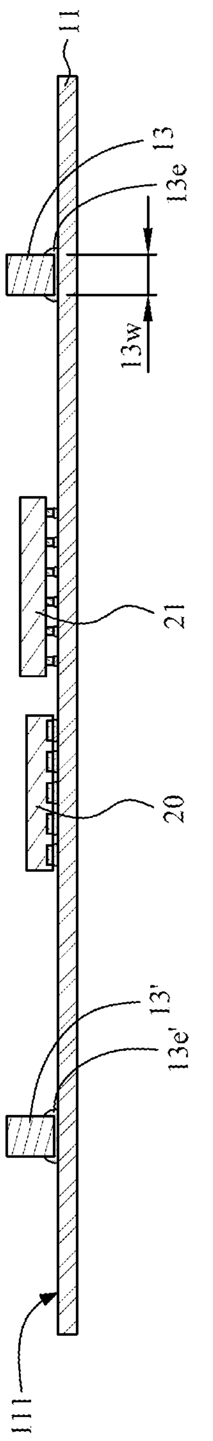

Referring to FIG. 2B, the interconnection structures 13 and 13' may be disposed over or on the surface 111 of the carrier 11. The interconnection structures 13 and 13' may be connected with the carrier 11 through electrical contacts 13*e*. The electronic component 20 and the electronic component 21 may be disposed over or on the surface 111 of the carrier 11. The electronic component 20 and the electronic component 21 may each be electrically coupled to the carrier 11 through solder bonding, Cu-to-Cu bonding, wire bonding, or hybrid bonding.

The electronic component 20 and the electronic component 21 may each be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some arrangements, the electronic component 20 and the electronic component 21 may each include a transmitter, a receiver, or a transceiver. In some arrangements, the electronic component 20 and the electronic component 21 may each include a processing unit and/or a controller. In some arrangements, the electronic component 20 and the electronic component 21 may each include a radio frequency IC (RFIC), an analog-to-digital (A/D) converter, a digital-to-analog (D/A) converter, a filter, a low noise amplifier (LNA), a power amplifier, a multiplexer, a demultiplexer, a modulator, and/or a demodulator, etc. In some arrangements, there may be any number of electronic components depending on design requirements.

The electronic component 20 and the electronic component 21 may each be electrically coupled to the antenna elements (such as the antenna elements 16 and 16' in FIG. 2K). The electronic component 20 and the electronic component 21 may each be electrically coupled to the antenna elements through the carrier 11 and the interconnection structures 13 and 13'. In some arrangements, the electronic component 20 and the electronic component 21 may each be configured to generate RF signals for transmission via the antenna elements and/or to process received RF signals from the antenna elements. In some arrangements, the signal transmission path may be attained by the carrier 11 and the interconnection structures 13 and 13'.

In some arrangements, the electronic component 20 and the electronic component 21 may each be configured to control the antenna elements. For example, the electronic component 20 and the electronic component 21 may each be configured to control the feeding start and end times, the feeding duration, the number of feed points, the location of feed points, the RF impedance matching, the transmitting start and end times, the receiving start and end times, the grounding start and end times, the grounding duration, the number of ground points, the location of ground points, the frequencies (or operating frequencies), the bandwidths (or operating bandwidths), the wavelengths of the EM waves, etc.

Figure 2C:
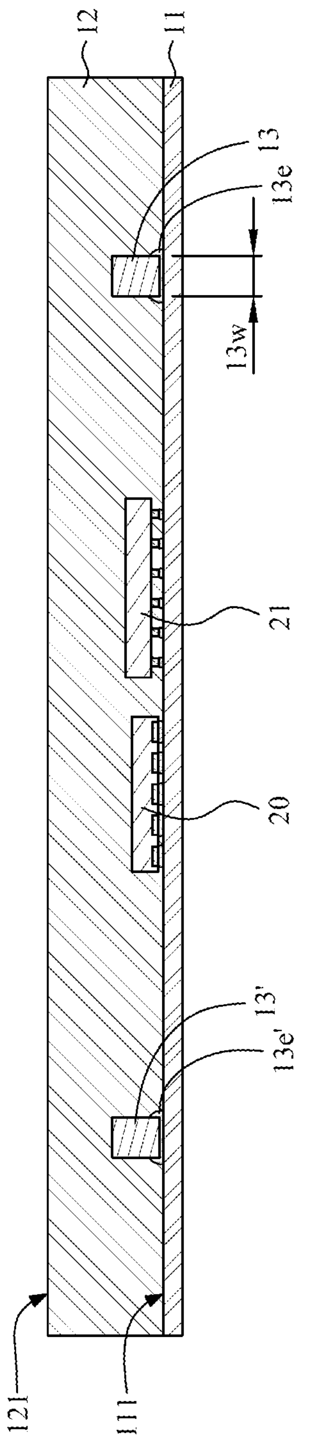

Referring to FIG. 2C, the encapsulant 12 may be disposed over the carrier 11 to cover the electronic components 20 and 21, and the interconnection structures 13 and 13'. In some arrangements, the encapsulant 12 may be formed by a molding technique, such as transfer molding, injection molding, or compression molding.

Figure 2D:
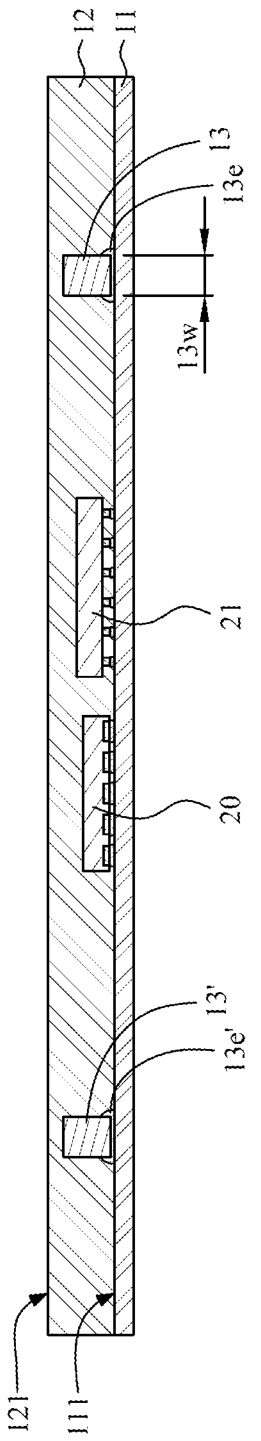

Referring to FIG. 2D, a portion of the encapsulant 12 may be removed by, for example, a grinding operation.

Figure 2E:
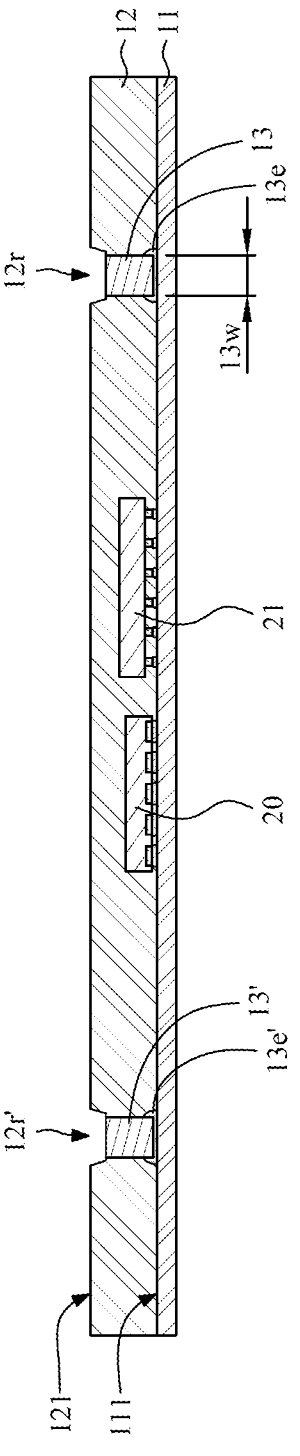

Referring to FIG. 2E, a portion of the encapsulant 12 may be removed by, for example, a laser cutting operation to form the recesses 12*r* and 12*r'* of the encapsulant 12. The top surface of the interconnection structure 13 may be exposed from the recess 12*r* and the top surface of the interconnection structure 13' may be exposed from the recess 12*r'*.

Figure 2F:
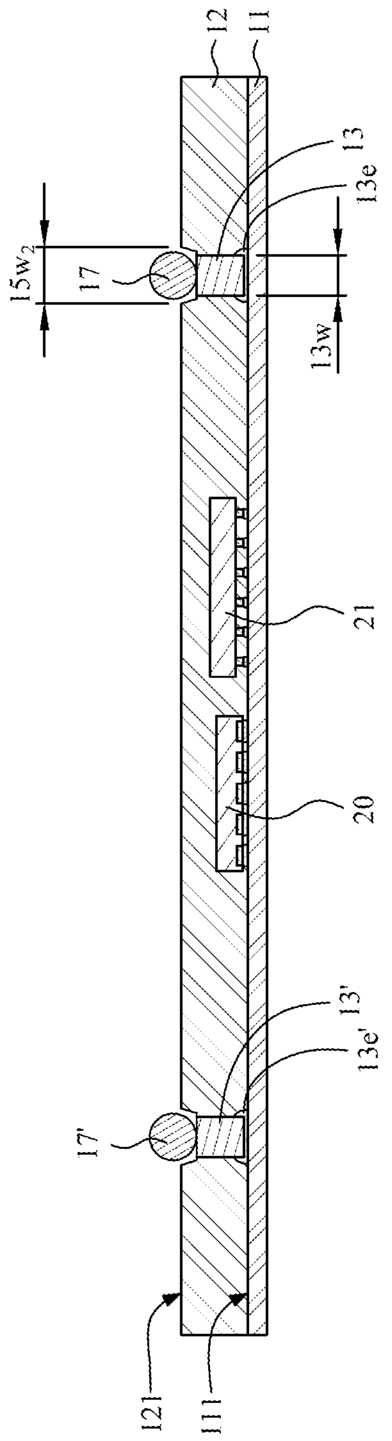

Referring to FIG. 2F, the bonding materials 17 and 17' may be respectively disposed in the recesses 12*r* and 12*r'* of the encapsulant 12.

Figure 2G:
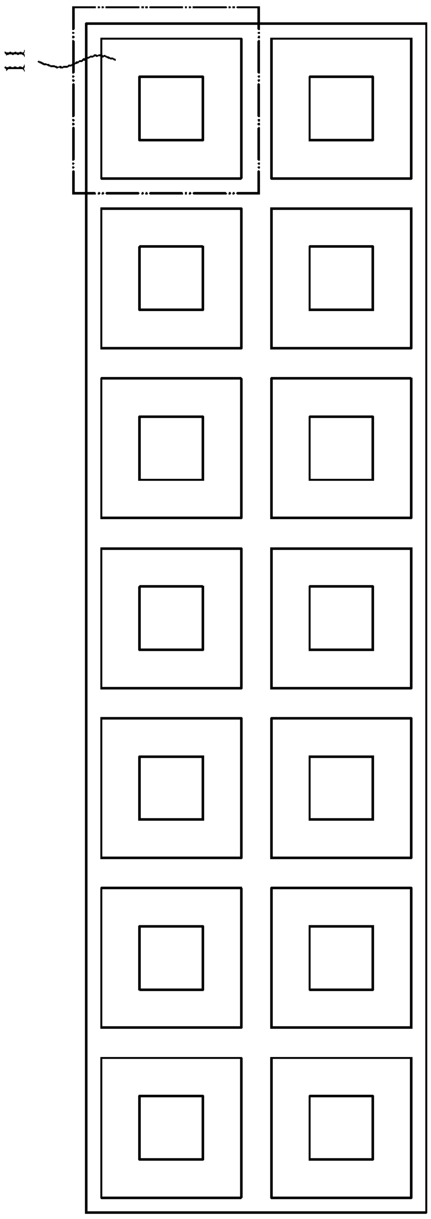

Referring to FIG. 2G, the carrier 11 and the encapsulant 12 are singulated or diced into a plurality of individual units in a singulation operation. In some arrangements, the singulation operation may be applied using a saw blade or laser cutting tool. The singulation operation may include cutting or sawing four sides of the carrier units. An individual unit, indicated by the dashed box, is obtained.

Figure 2H:
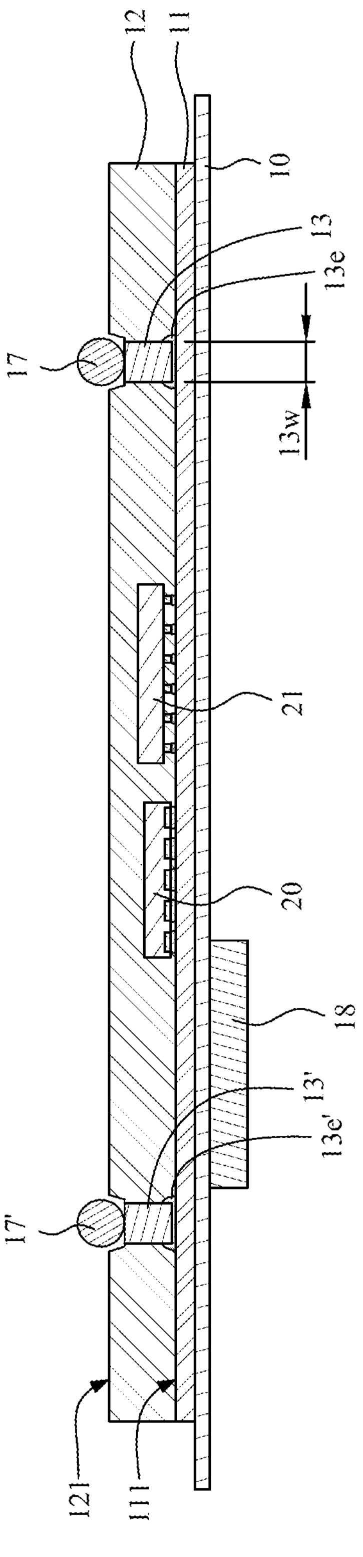

Referring to FIG. 2H, the individual unit obtained from the singulation operation in FIG. 2G may be disposed over the carrier 10. The power source 18 may be disposed over the carrier 10. In some arrangements, the bonding materials 17 and 17' may be formed after the singulation operation in FIG. 2G. In some arrangements, the bonding materials 17 and 17' may be formed after the singulation operation in FIG. 2H.

Figure 2I:
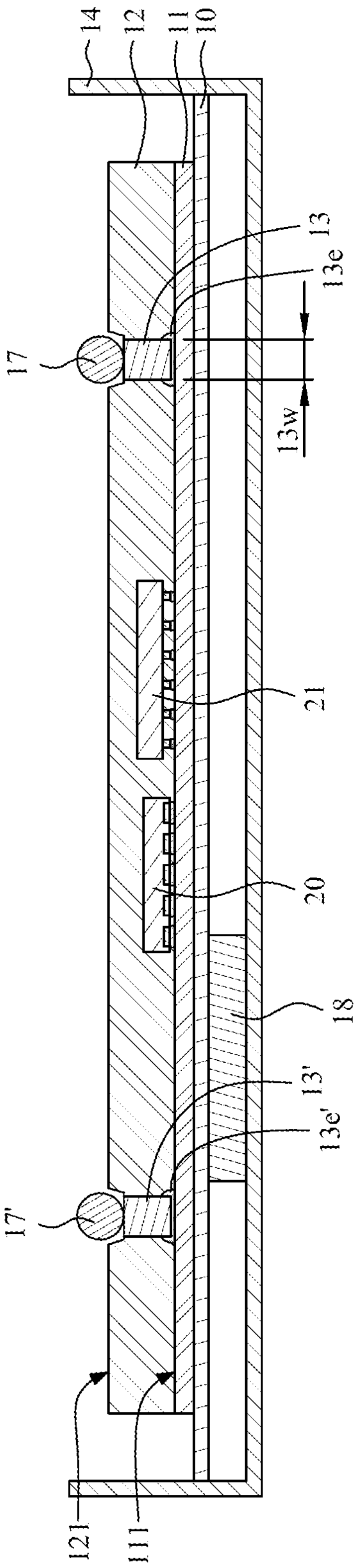

Referring to FIG. 2I, the individual unit obtained from FIG. 2H may be disposed in the cover 14. The cover 14 may have a base and a sidewall extending from the base. The base may contact the power source 18 and the sidewall may contact the carrier 10.

Figure 2J:
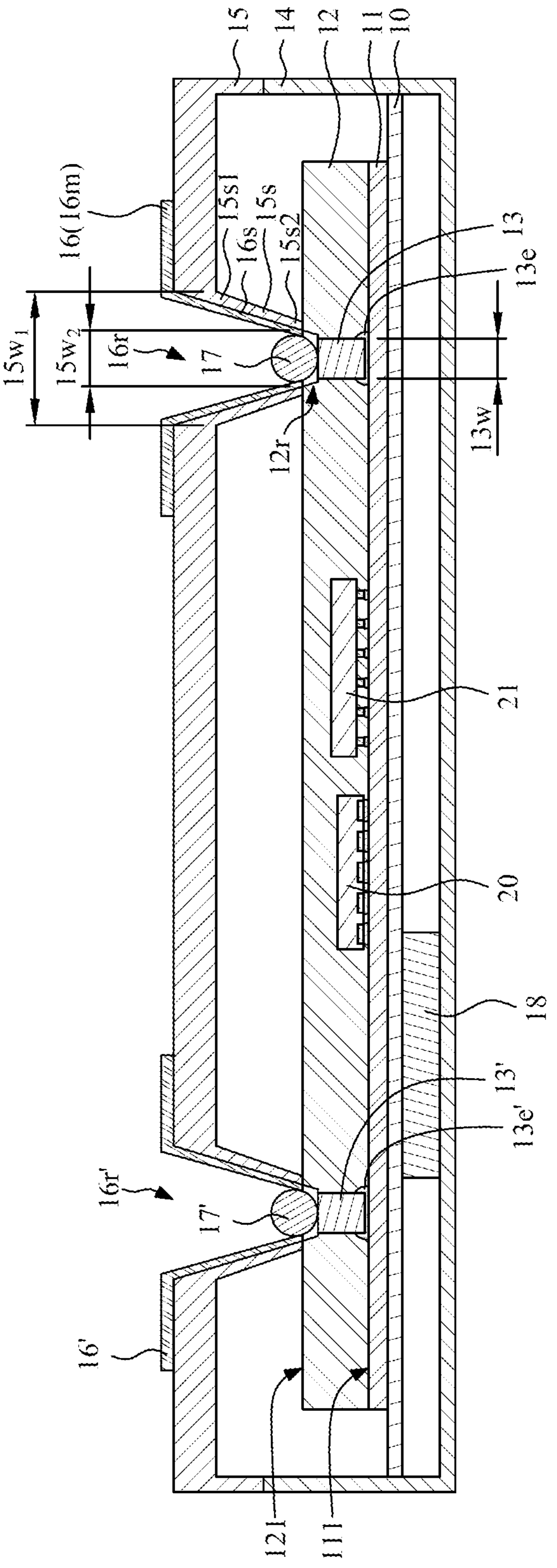
Figure 2K:
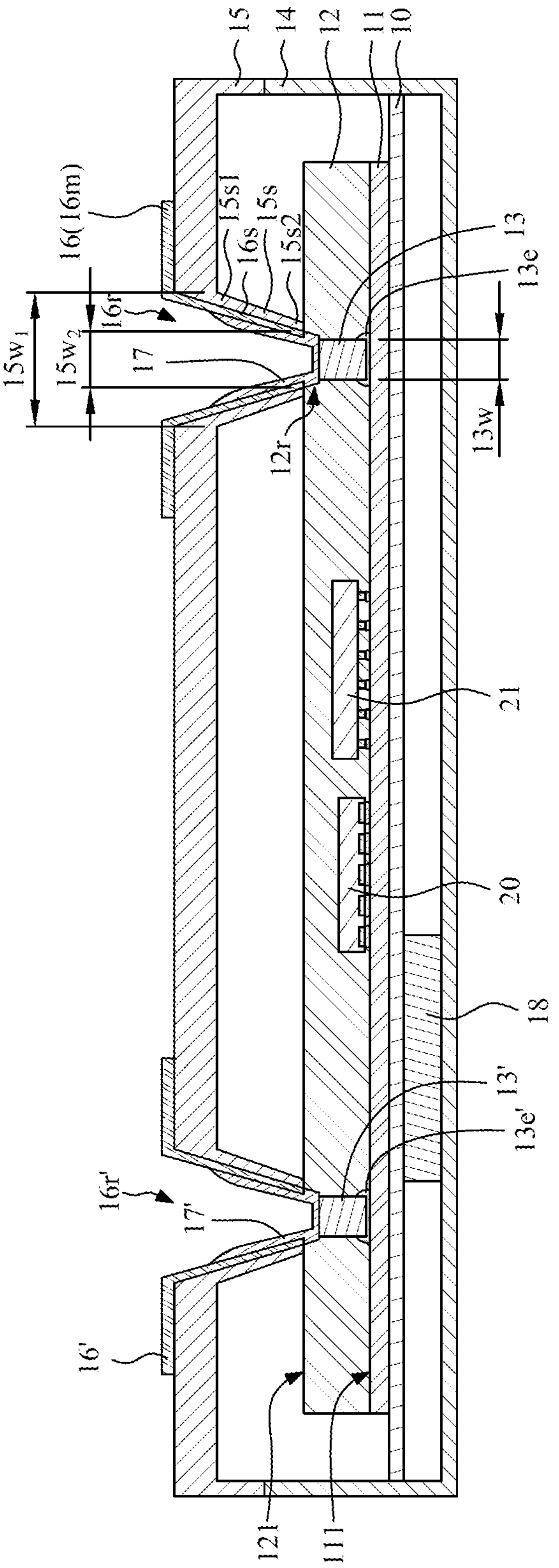

Referring to FIG. 2J, the cover 15 may be attached to the cover 14 by, for example, using an alignment machine. In some arrangements, the antenna elements 16 and 16' may be preformed in the cover 15 by a laser direct structuring (LDS) process. For example, an antenna design can be transferred onto a surface an injection-molded structure (which may include a liquid crystal polymer (LCP)) by activating the surface with a laser beam. During the activation, a physical-chemical reaction may produce metallic nuclei. In addition to the activation, the laser beam may form a microrough surface on which the copper firmly anchors itself during metallization. After the activation, a plating process may be conducted to form the antenna elements 16 and 16'.

Referring to FIG. 2K, a welding operation may be performed to reflow or melt the bonding materials 17 and 17'. For example, the structure from FIG. 2J may be placed in a thermal chamber, and the welding operation may be performed by either heating the chamber and/or passing a heated gas or liquid medium through the recesses 16*r* and 16*r'* to heat the bonding materials 17 and 17'.

In some arrangements, as shown in FIG. 2K, the bonding materials 17 and 17' may be softened or become flowable, climbing into the recesses 16*r* and 16*r'*. The bonding materials 17 and 17' may be respectively connected with the antenna elements 16 and 16', forming a continuous body of a bonding structure.

In some arrangements, the bonding temperature utilized to bond the antenna elements 16 and 16' and the interconnection structures 13 and 13' (or the reflowable temperature of the bonding material 17) may be about 260 degrees Celsius or higher. Therefore, the cover 15 may withstand temperatures up to 260 degrees Celsius or higher.

FIG. 3 illustrates a cross-sectional view of an electronic device 3 in accordance with some arrangements of the present disclosure. The electronic device 3 of FIG. 3 is similar to the electronic device 1*a* in FIG. 1A, differing as follows.

The electronic device 3 may be exclusive of the carrier 10 and the cover 14. The cover 15 may cover the encapsulant 12. The cover 15 may be in contact with the encapsulant 12. The resonant cavity may be exclusive of an air cavity to reduce the size of the electronic device 3. The width (e.g., the smallest width) 15*w*2 of the distal end of the recess of the cover 15 may be greater than the width 13*w* of the interconnection structure 13. Since the molding material of the encapsulant 12 cannot be plated (as shown in FIG. 4E), the bonding material 17 may be used to connect the interconnection structure 13 to the extension 16*s* of the antenna element 16.

In some arrangements, the greater width 15*w*2 of the cover 15 may enhance structural strength and stability for the interconnection structure 13.

In some arrangements, the power source 18 may include a rechargeable battery. In some arrangements, the electronic device 3 may include a charging port 30 and may be connected to an external power source through a connector (such as a cable or an electrical wire). Power may be supplied to the power source 18 through the connector, the charging port 30, and the conductive structures of the carrier 11. In some other arrangements, the power source 18 may be charged by using a self-generator (such as an induction charger), solar light, or a non-contact charging method. For example, the power source 18 may not need connectors and can be charged wirelessly. Therefore, there is no need for battery replacement.

FIGS. 4A, 4B, 4C, 4D, 4E, 4F, and 4G are cross-sections of one or more stages of a method of manufacturing an electronic device in accordance with some arrangements of the present disclosure. In some arrangements, the electronic device 3 in FIG. 3 may be manufactured by the following operations with respect to FIGS. 4A, 4B, 4C, 4D, 4E, 4F, and 4G.

Figure 4A:
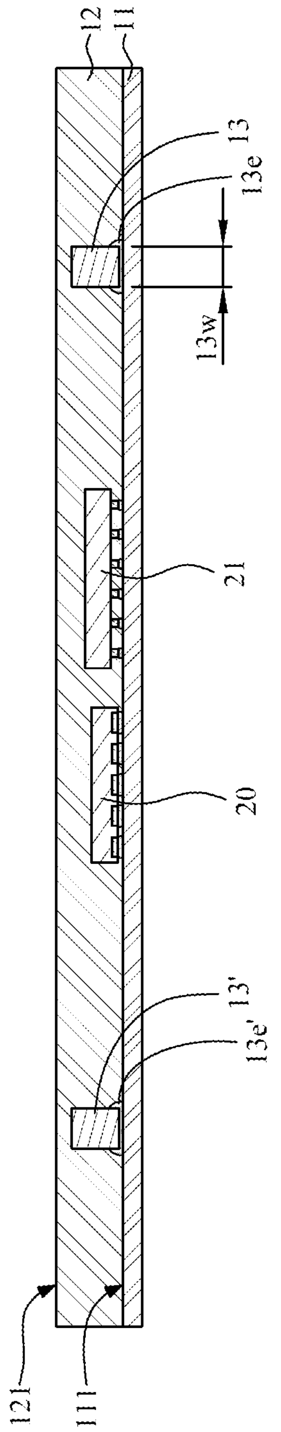
FIGS. 4A, 4B, 4C, 4D, 4E, 4F, and 4G are cross-sections of one or more stages of a method of manufacturing an electronic device in accordance with some arrangements of the present disclosure.

Referring to FIG. 4A, which is subsequent to FIG. 2C, a portion of the encapsulant 12 may be removed by, for example, a grinding operation.

Figure 4B:
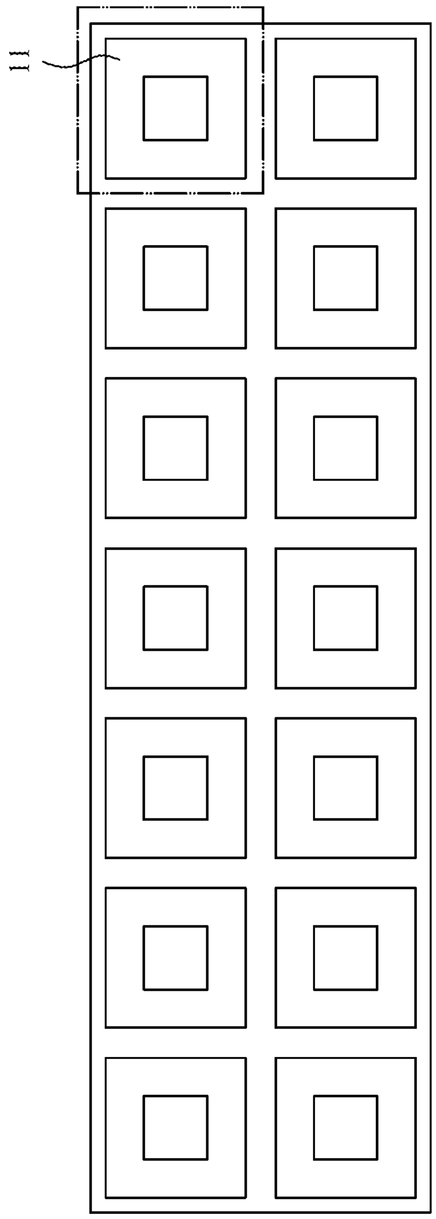

Referring to FIG. 4B, the carrier 11 and the encapsulant 12 are singulated or diced into a plurality of individual units in a singulation operation. An individual unit, indicated by the dashed box, is obtained.

Figure 4C:
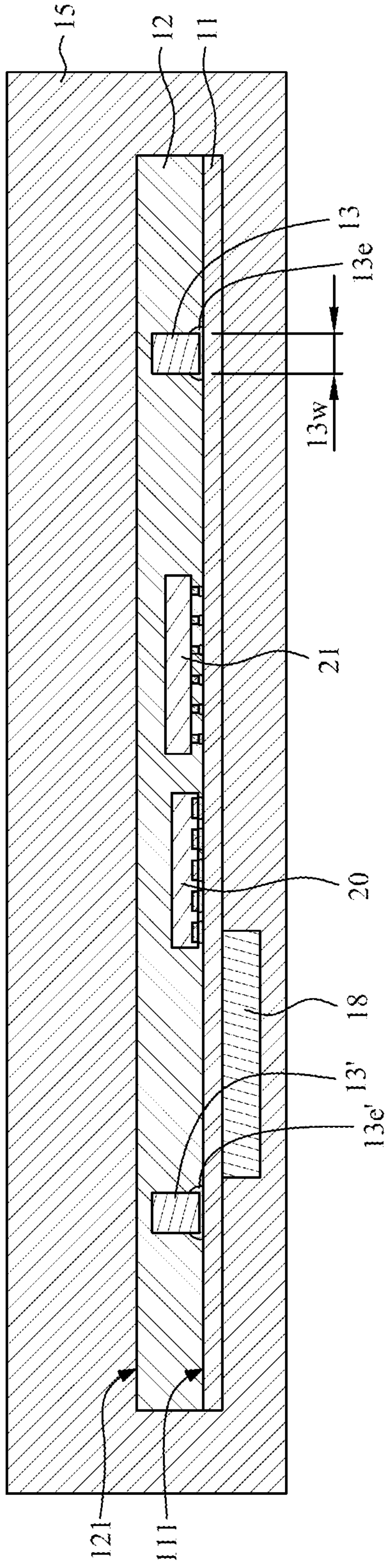

Referring to FIG. 4C, the cover 15 may be formed to cover the individual unit obtained from the singulation operation in FIG. 4B by a molding technique, such as transfer molding, injection molding, or compression molding.

Figure 4D:
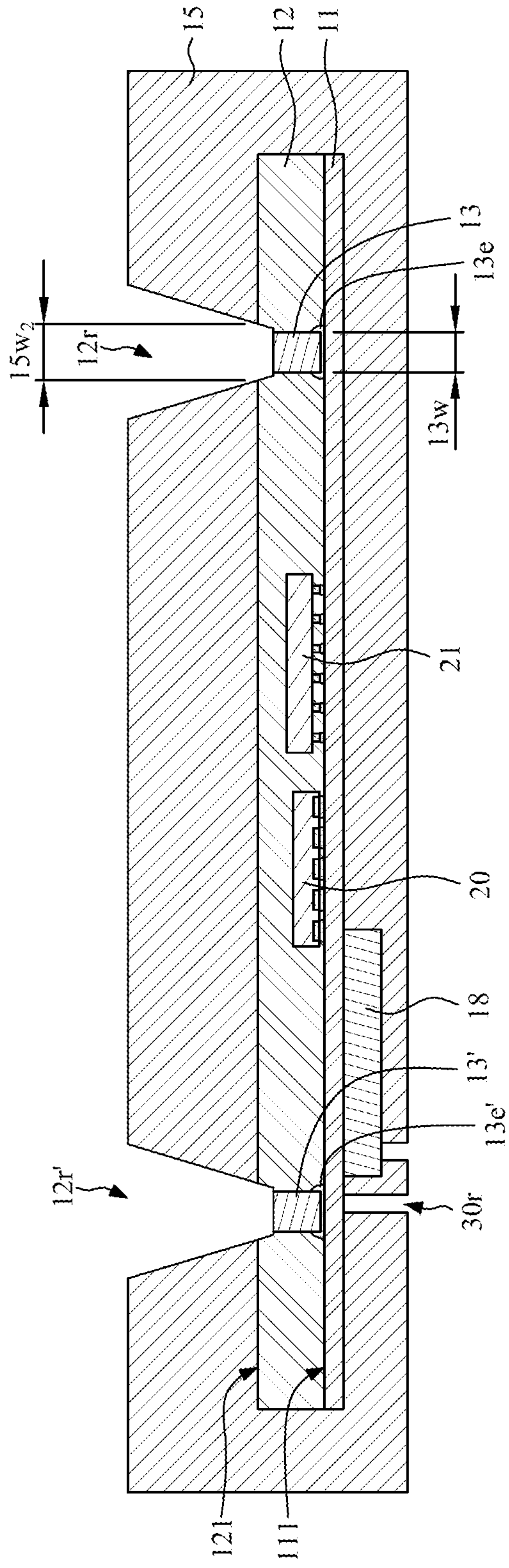
Figure 4E:
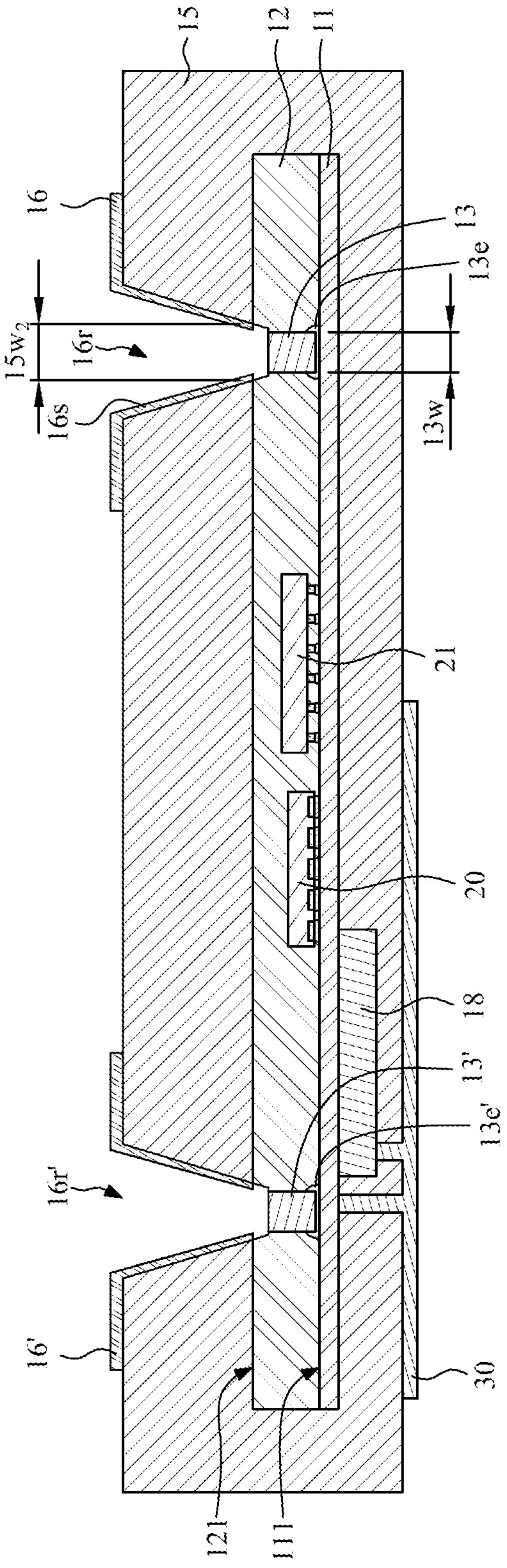

Referring to FIG. 4D, a portion of the encapsulant 12 and a portion of the cover 15 may be removed by, for example, a laser cutting operation to form the recesses 12*r* and 12*r'* through the encapsulant 12 and the cover 15. The top surface of the interconnection structure 13 may be exposed from the recess 12*r* and the top surface of the interconnection structure 13' may be exposed from the recess 12*r'*. A portion of the cover 15 may be removed to form an opening 30*r* for connection of the power source 18.

Referring to FIG. 4E, the antenna elements 16 and 16' may be formed in the recesses 12*r* and 12*r'* through plating. Conductive films may be formed over the sidewalls of the recesses 12*r* and 12*r'*. In addition, the charging port 30 may be formed in the opening 30*r* for connection of the power source 18. In some arrangements, the antenna elements 16 and 16' may be formed in the recesses 12*r* and 12*r'* through a laser direct structuring (LDS) process.

Figure 4F:
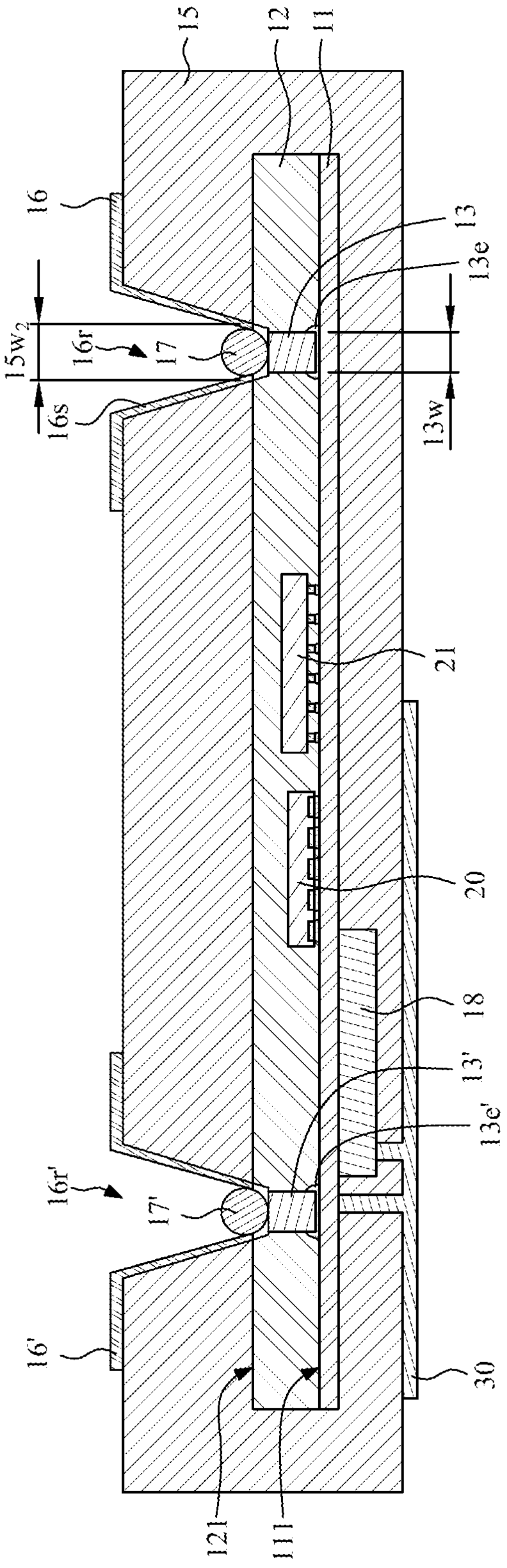

Referring to FIG. 4F, the bonding materials 17 and 17' may be respectively disposed in the recesses 12*r* and 12*r'*. Since the encapsulant 12 may not be plated, the bonding material 17 may be configured to connect the interconnection structure 13 to the antenna element 16 and the bonding material 17' may be configured to connect the interconnection structure 13' to the antenna element 16'.

Figure 4G:
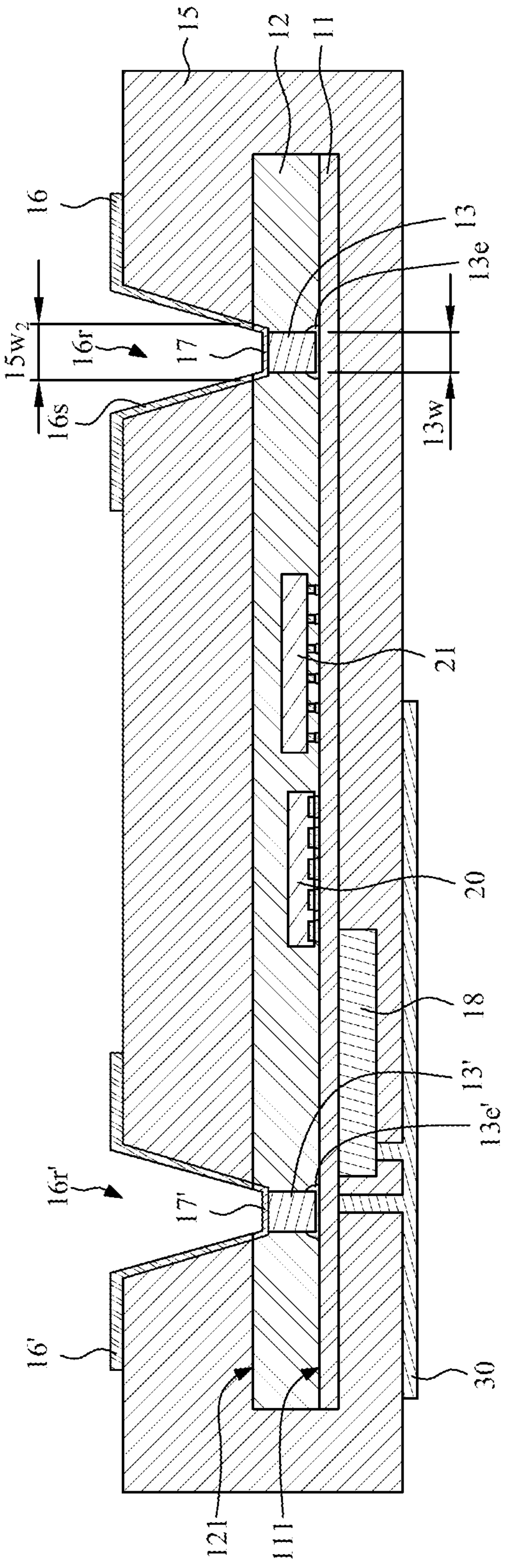

Referring to FIG. 4G, a welding operation may be performed to reflow or melt the bonding materials 17 and 17'. The bonding materials 17 and 17' may be softened or become flowable. The bonding materials 17 and 17' may cover the bottom surfaces of the recesses 12*r* and 12*r'*. In some arrangements, the bonding materials 17 and 17' may climb over the antenna elements 16 and 16' (or climb into the recesses 16*r* and 16*r'*).

FIG. 5 illustrates a cross-sectional view of an electronic device 5 in accordance with some arrangements of the present disclosure. The electronic device 5 of FIG. 5 is similar to the electronic device 3 in FIG. 3, differing as follows.

The width (e.g., the smallest width) 15*w*2 of the distal end of the recess of the cover 15 may be smaller than the width 13*w* of the interconnection structure 13. In some arrangements, as the width 15*w*2 become smaller, more antenna elements can be arranged or disposed over the cover 15. In addition, since the interconnection structure 13 contacts the cover 15 and the molding material of the encapsulant 12 is not exposed, no bonding material 17 is required. Therefore, the design flexibility of the connection between the interconnection structure 13 and the antenna elements is better.

FIGS. 6A, 6B, 6C, 6D, and 6E are cross-sections of one or more stages of a method of manufacturing an electronic device in accordance with some arrangements of the present disclosure. In some arrangements, the electronic device 5 in FIG. 5 may be manufactured by the following operations with respect to FIGS. 6A, 6B, 6C, 6D, and 6E.

Figure 6A:
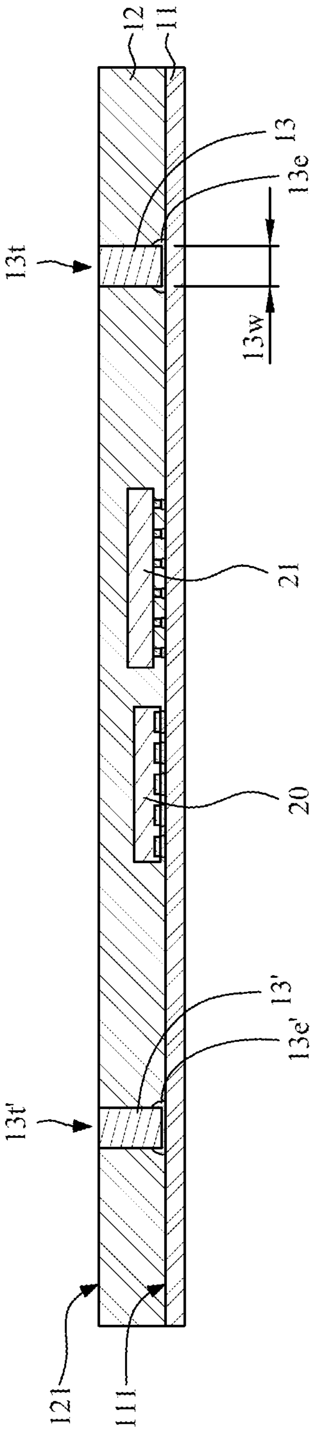
FIGS. 6A, 6B, 6C, 6D, and 6E are cross-sections of one or more stages of a method of manufacturing an electronic device in accordance with some arrangements of the present disclosure.

Referring to FIG. 6A, which is subsequent to FIG. 2C, a portion of the encapsulant 12 may be removed by, for example, a grinding operation. The top surfaces 13*t* and 13*t*' of the interconnection structures 13 and 13' may be substantially coplanar with the surface 121 of the encapsulant 12.

Figure 6B:
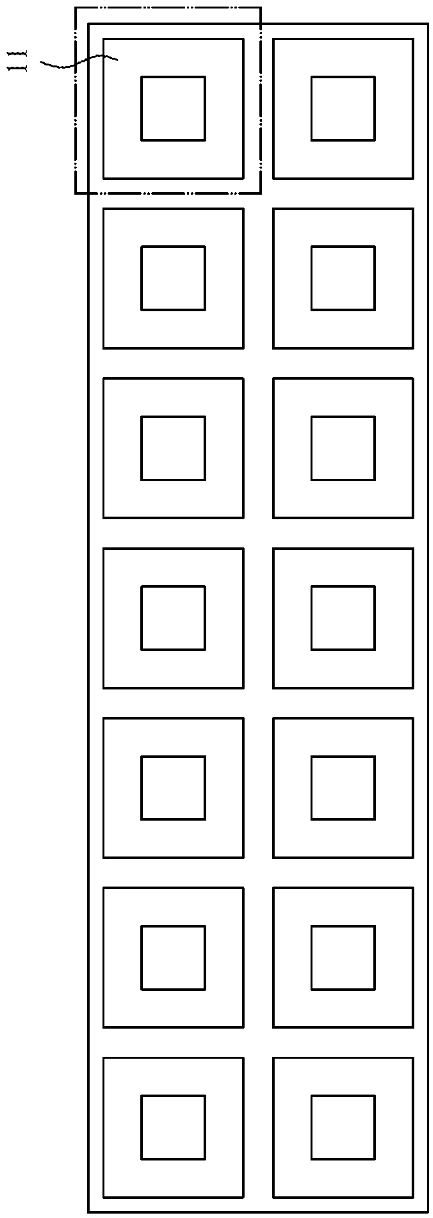

Referring to FIG. 6B, the carrier 11 and the encapsulant 12 are singulated or diced into a plurality of individual units in a singulation operation. An individual unit, indicated by the dashed box, is obtained.

Figure 6C:
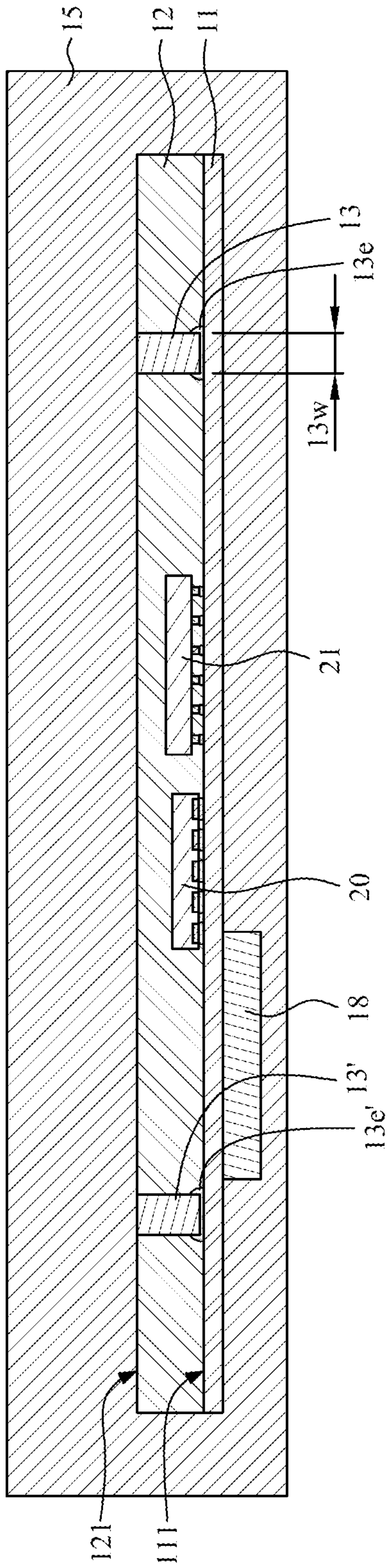

Referring to FIG. 6C, the cover 15 may be formed to cover the individual unit obtained from the singulation operation in FIG. 6B by a molding technique, such as transfer molding, injection molding, or compression molding.

Figure 6D:
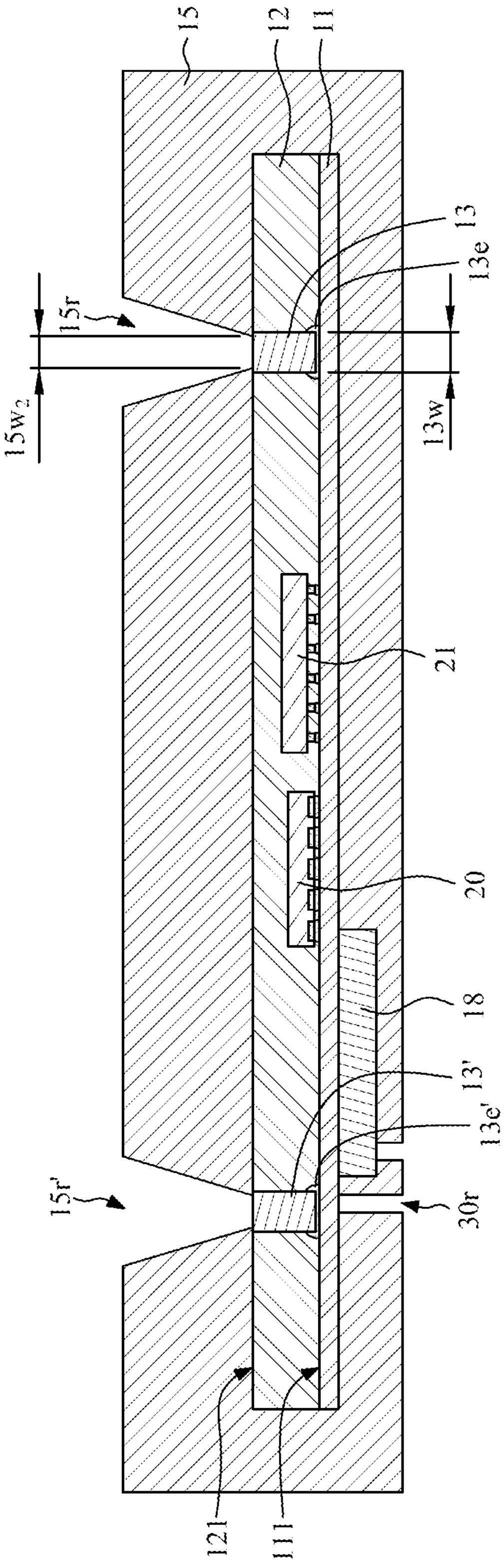

Referring to FIG. 6D, a portion of the cover 15 may be removed by, for example, a laser cutting operation to form the recesses 15*r* and 15*r*' of the cover 15. The top surface 13*t* of the interconnection structure 13 may be exposed from the recess 15*r* and the top surface 13*t*' of the interconnection structure 13' may be exposed from the recess 15*r*'. A portion of the cover 15 may be removed to form an opening 30*r* for connection of the power source 18.

Figure 6E:
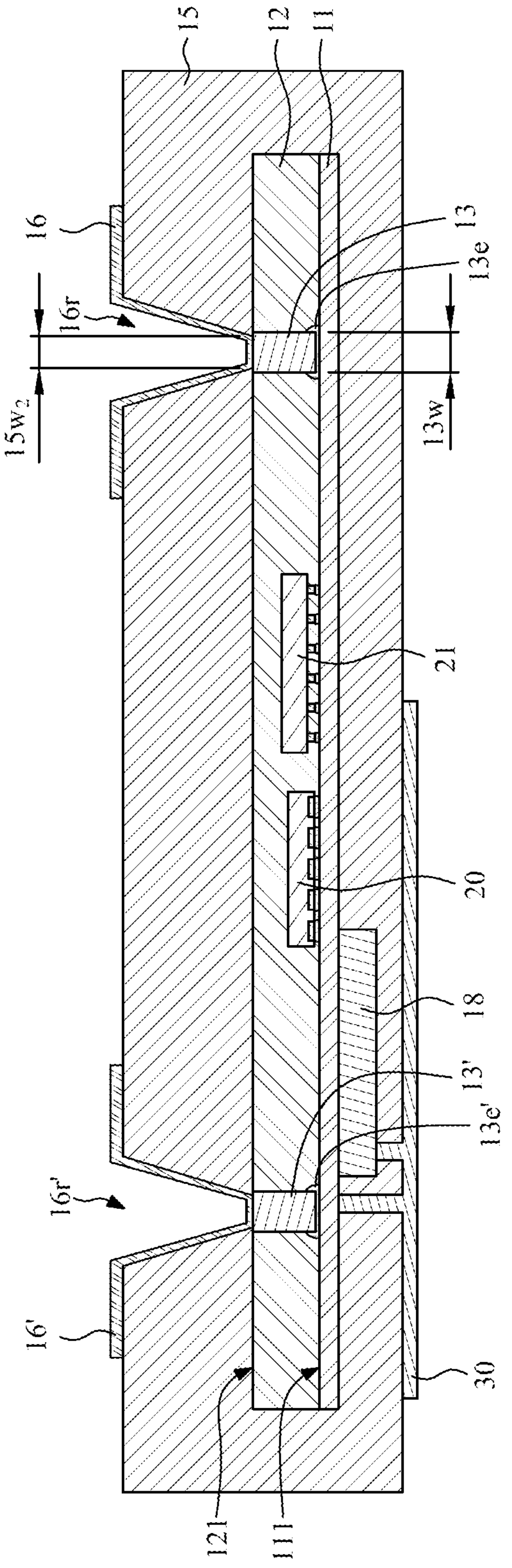

Referring to FIG. 6E, the antenna elements 16 and 16' may be formed in the recesses 15*r* and 15*r*' through plating. Conductive films may be formed over the sidewalls of the recesses 15*r* and 15*r*'. Conductive films may be formed over the top surfaces 13*t* and 13*t*' of the interconnection structures 13 and 13'. In some arrangements, the antenna elements 16 and 16' may be formed in the recesses 15*r* and 15*r*' through a LDS process. For example, the cover 15 may be activated. After the activation, a plating process may be conducted to form the antenna elements 16 and 16' over the sidewalls of the recesses 15*r* and 15*r*' and over the top surfaces 13*t* and 13*t*' of the interconnection structures 13 and 13'. In addition, the charging port 30 may be formed in the opening 30*r* for connection of the power source 18.

Figure 7A:
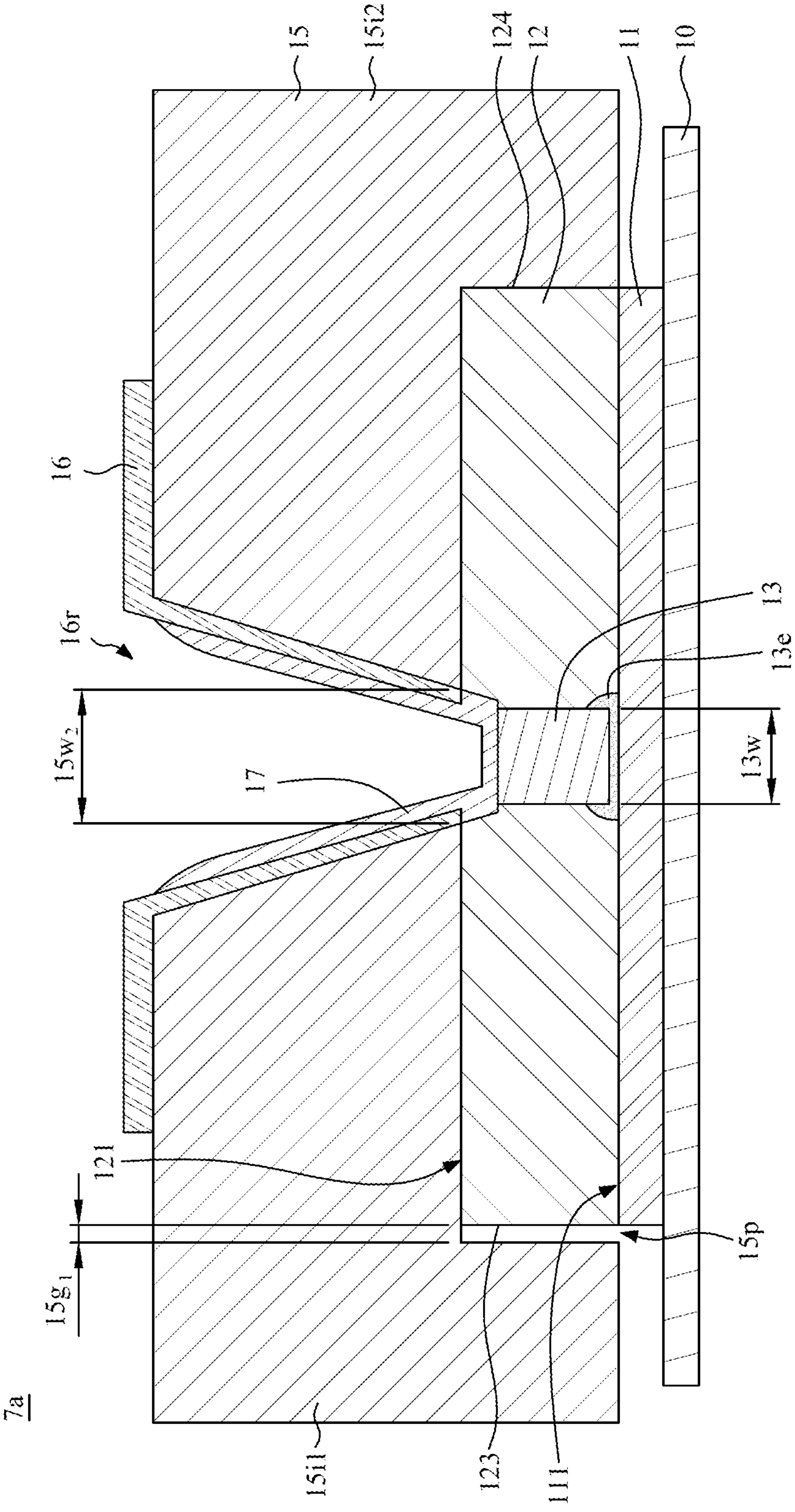
FIG. 7A illustrates a cross-sectional view of an electronic device in accordance with some arrangements of the present disclosure.

FIG. 7A illustrates a cross-sectional view of an electronic device 7*a* in accordance with some arrangements of the present disclosure. The electronic device 7*a* of FIG. 7A is similar to the electronic device 1*a* in FIG. 1A and the electronic device 3 in FIG. 3, differing as follows.

The electronic device 7*a* may be exclusive of the cover 14. The encapsulant 12 may be accommodated in a space 15*p* defined by the cover 15. The cover 15 may contact the surface 121 of the encapsulant 12. A first portion 15*i*1 of the cover 15 may cover a sidewall (or a lateral surface) 123 of the encapsulant 12. The first portion 15*i*1 of the cover 15 may be disposed adjacent to the sidewall 123 of the encapsulant 12. The first portion 15*i*1 of the cover 15 may be spaced apart from the sidewall 123 of the encapsulant 12. A second portion 1512 of the cover 15 may contact a sidewall (or a lateral surface) 124 of the encapsulant 12 opposite to the sidewall 123. A dimension of the cover 15 and a dimension of the encapsulant 12 may have an engineering tolerance. There may be a gap 15$g_1$ between the cover 15 and the encapsulant 12.

Figure 7B:
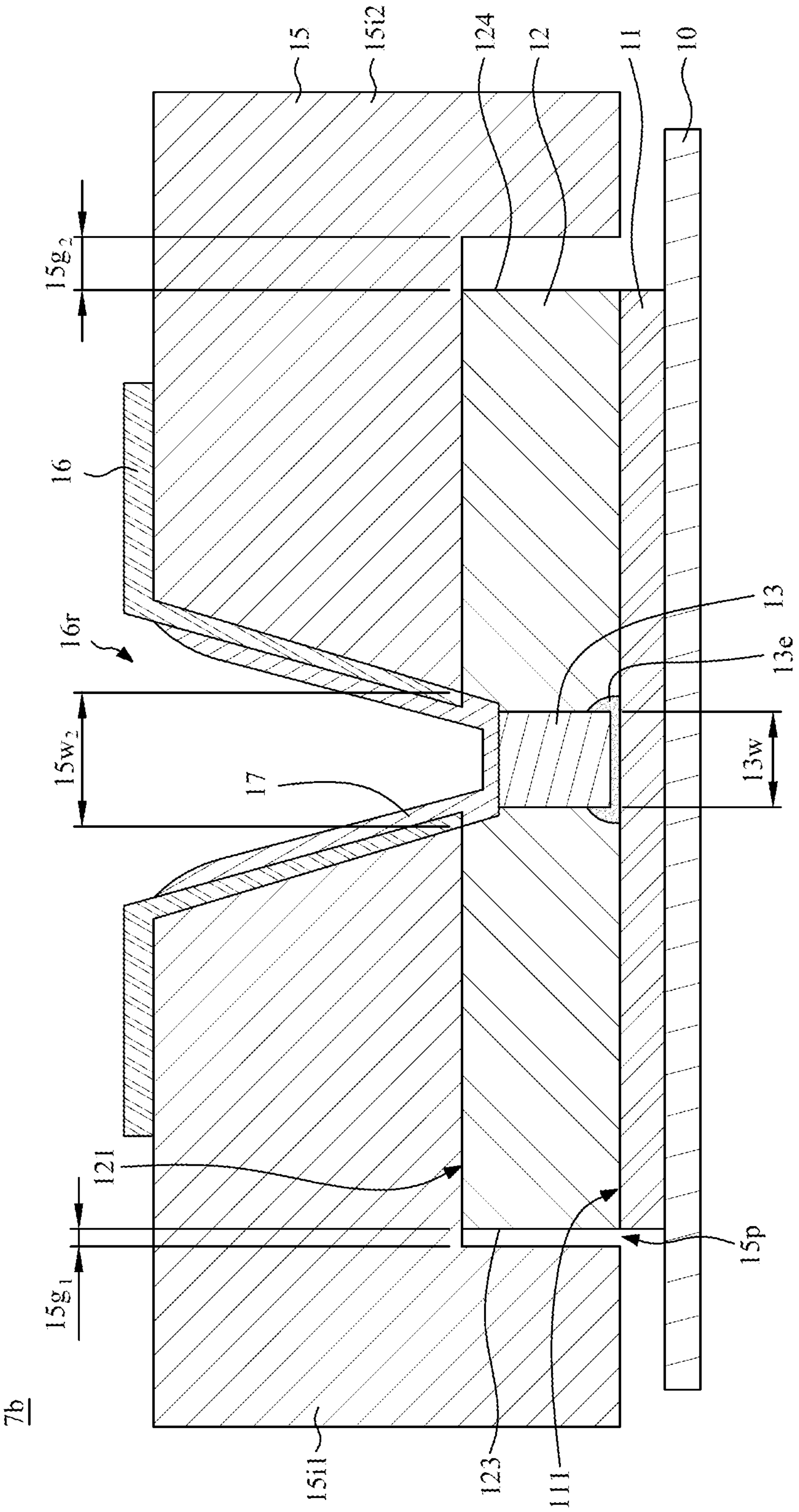
FIG. 7B illustrates a cross-sectional view of an electronic device in accordance with some arrangements of the present disclosure.

FIG. 7B illustrates a cross-sectional view of an electronic device 7*b* in accordance with some arrangements of the present disclosure. The electronic device 7*b* of FIG. 7B is similar to the electronic device 7*a* in FIG. 7A except that there may be gaps 15$g_1$ and 15$g_2$ on opposite sides of the encapsulant 12. The gap 15$g_2$ may be greater than the gap 15$g_1$. A distance between the second portion 1512 of the cover 15 and the sidewall 124 of the encapsulant 12 may be different from a distance between the first portion 15*i*1 of the cover 15 and the sidewall 123 of the encapsulant 12.

Figure 7C:
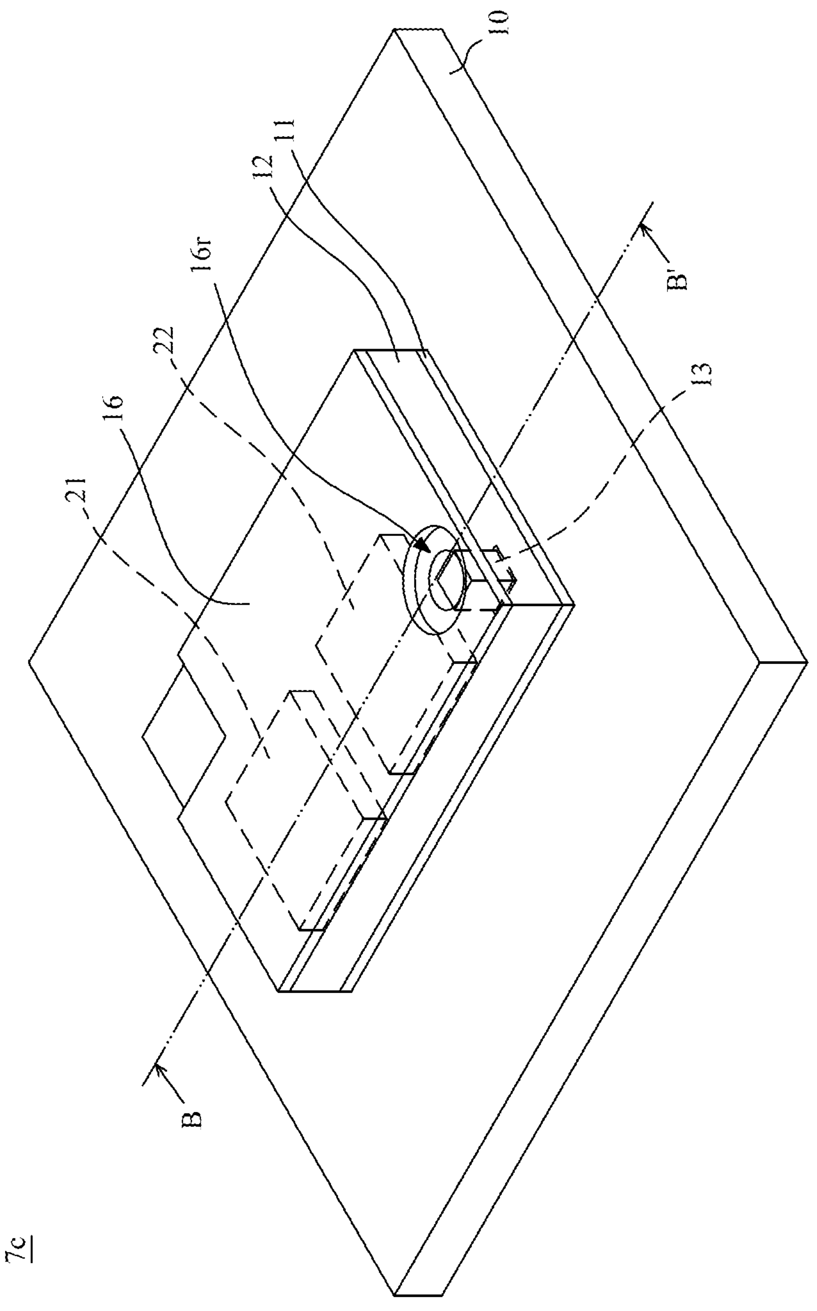
FIG. 7C illustrates a perspective view of an electronic device in accordance with some arrangements of the present disclosure.

FIG. 7C illustrates a perspective view of an electronic device 7*c* in accordance with some arrangements of the present disclosure. The same or similar elements between FIG. 7A and FIG. 7C may use the same reference numerals and/or letters and are not repeated hereinafter for conciseness. The cover 15 in FIG. 7A is omitted. The carrier 10 may include a main board of a user equipment (UE).

Figure 8A:
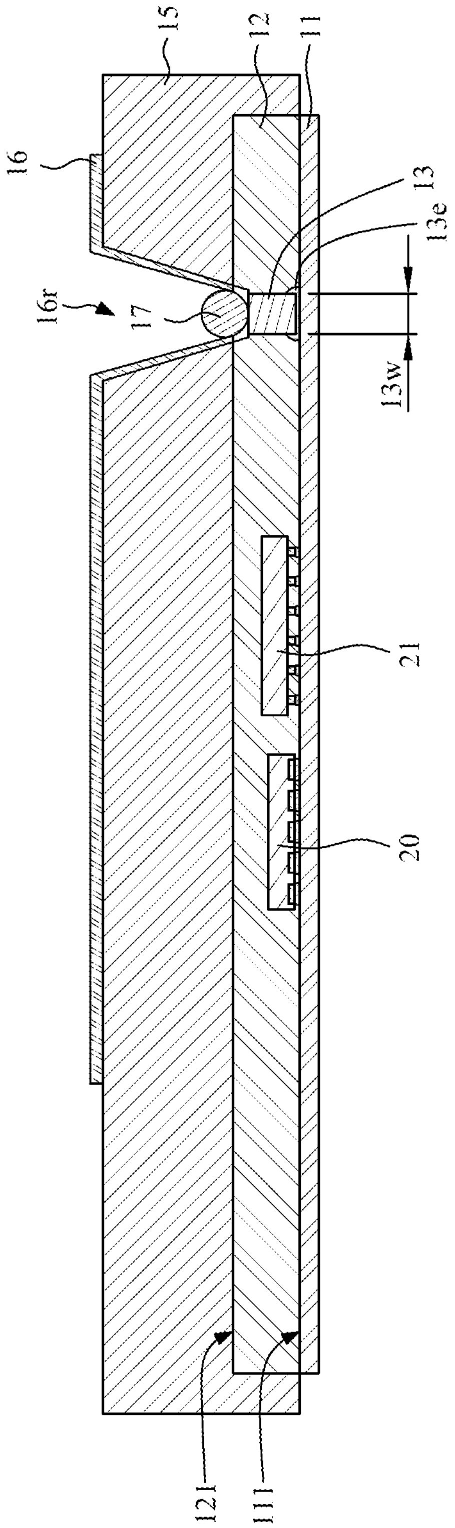
FIGS. 8A and 8B are cross-sections of one or more stages of a method of manufacturing an electronic device in accordance with some arrangements of the present disclosure.
Figure 8B:
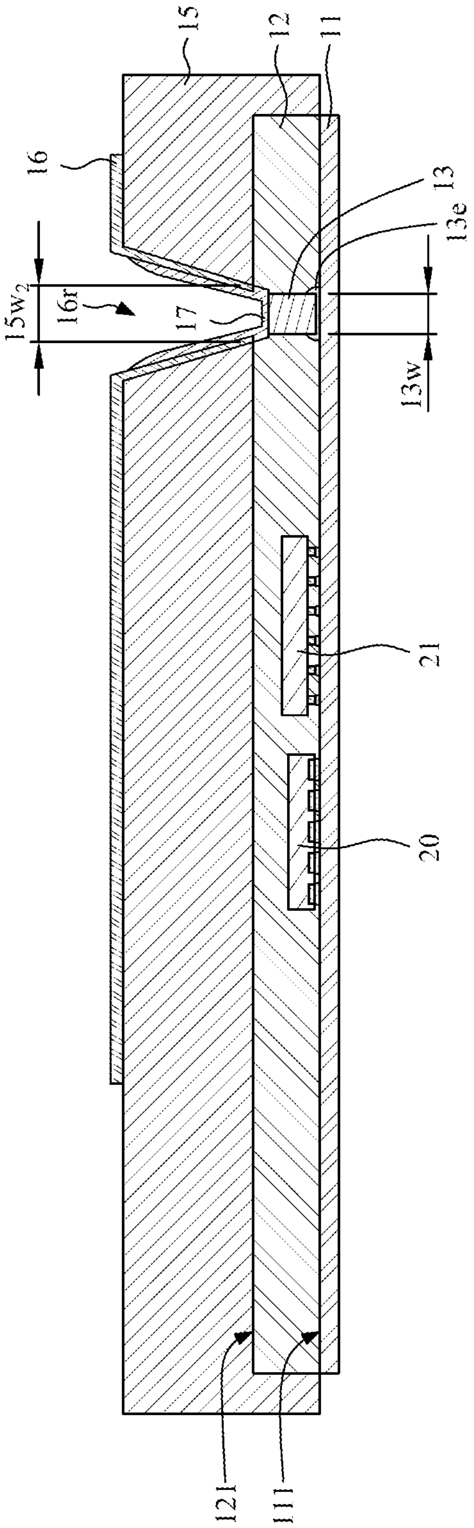

FIGS. 8A and 8B are cross-sections of one or more stages of a method of manufacturing an electronic device in accordance with some arrangements of the present disclosure. In some arrangements, the electronic device 7*c* in FIG. 7C may be manufactured by the following operations with respect to FIGS. 8A and 8B. In some arrangements, the cross-sections are cross-sections of FIG. 7C through line BB'.

Referring to FIG. 8A, which is subsequent to FIG. 2G, the individual unit obtained from the singulation operation in FIG. 2G may be disposed over the carrier 10. The cover 15 may be attached to the encapsulant 12 by, for example, using an alignment machine. In some arrangements, the antenna elements 16 and 16' may be pre-formed in the cover 15. The bonding material 17 may be disposed in the recesses 12*r* and 12*r*' of the encapsulant 12.

Referring to FIG. 8B, a welding operation may be performed to reflow or melt the bonding material 17. The bonding material 17 may be softened or become flowable. The bonding material 17 may cover the bottom surface of the recess 16*r*. In some arrangements, the bonding material 17 may climb over the antenna element 16 (or climb into the recess 16*r*).

Figure 9A:
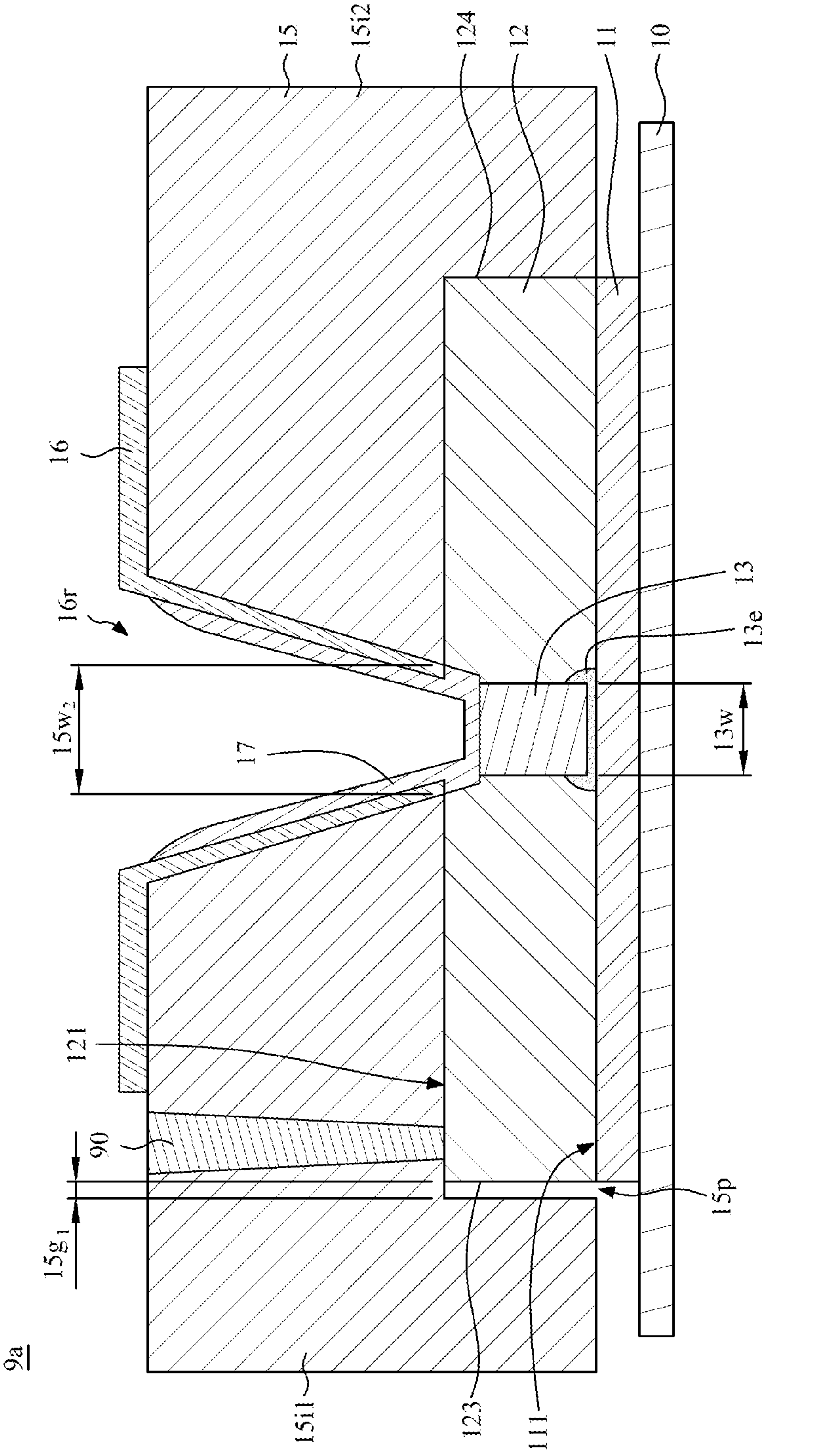
FIG. 9A illustrates a cross-sectional view of an electronic device in accordance with some arrangements of the present disclosure.

FIG. 9A illustrates a cross-sectional view of an electronic device 9*a* in accordance with some arrangements of the present disclosure. The electronic device 9*a* of FIG. 9A is similar to the electronic device 7*a* in FIG. 7A except that the cover 15 may be attached to the surface 121 of the encapsulant 12 by an adhesive layer 90. The adhesive layer 90 may be filled in an opening of the cover 15. The adhesive layer 90 may provide fixation to prevent the cover 15 from deviating from its original position due to softening of the bonding material 17 by heat, thus avoiding affecting the quality of signal transmission path and antenna characteristics. In some arrangements, the adhesive layer 90 may include thermoset tape, which can be thermally and/or optically cured to provide adhesion. By way of example, the material of the adhesive layer 90 may be a thermoset gel including a monomer such as a resin monomer, hardener, catalyst, solvent, diluent, fillers, and other additives.

Figure 9B:
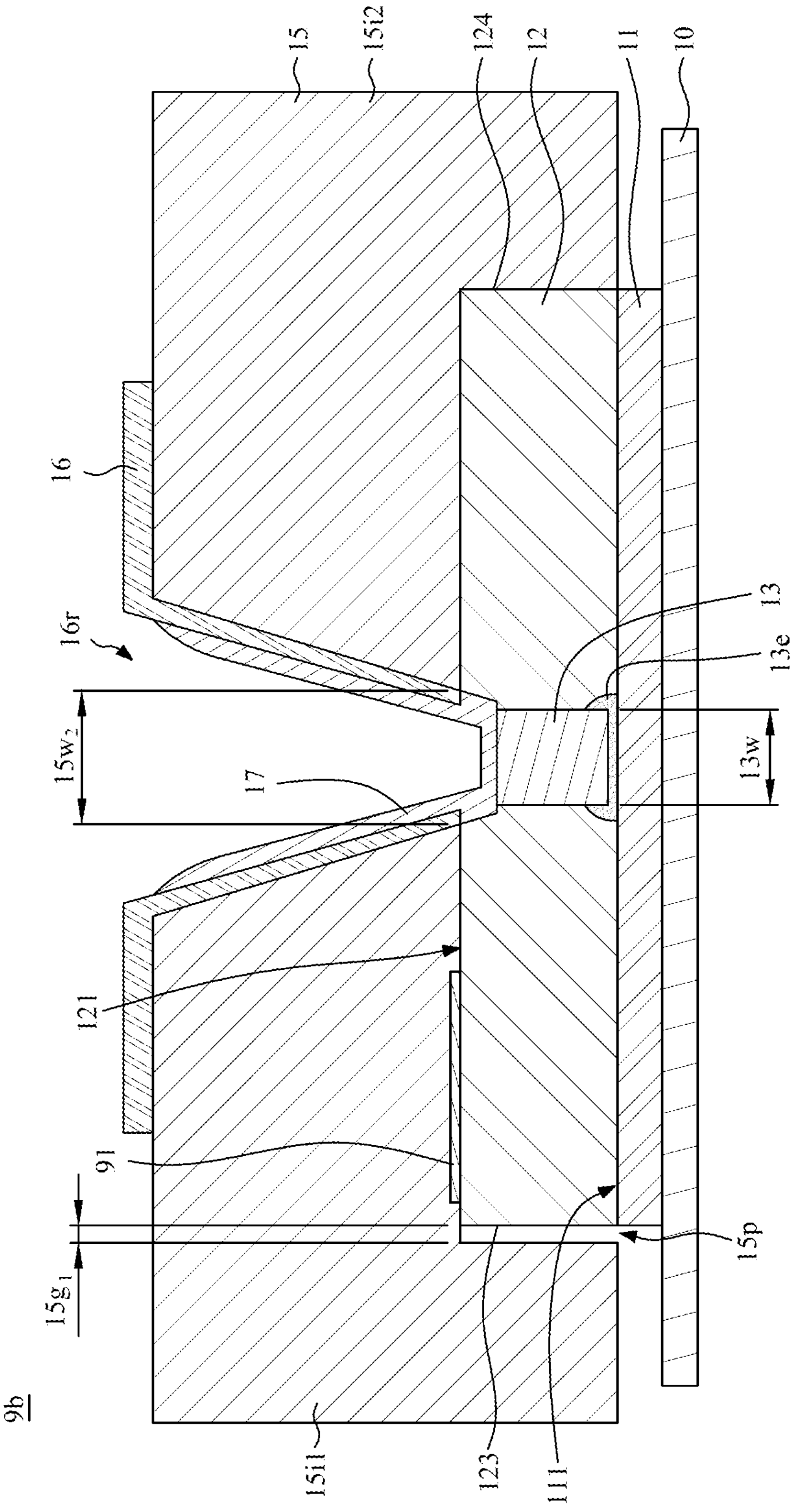
FIG. 9B illustrates a cross-sectional view of an electronic device in accordance with some arrangements of the present disclosure.

FIG. 9B illustrates a cross-sectional view of an electronic device 9*b* in accordance with some arrangements of the present disclosure. The electronic device 9*b* of FIG. 9B is similar to the electronic device 9*a* in FIG. 9A except that the adhesive layer 91 is applied on the surface 121 of the encapsulant 12. In some arrangements, the adhesive layer 91 may be disposed in the gap 15*g*1. The adhesive layer 91 may provide fixation to prevent the cover 15 from deviating from its original position due to softening of the bonding material 17 by heat, thus avoiding affecting the quality of signal transmission path and antenna characteristics.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 10+S/m, such as at least 105 S/m or at least 106 S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to +10% of that numerical value, such as less than or equal to +5%, less than or equal to +4%, less than or equal to +3%, less than or equal to +2%, less than or equal to +1%, less than or equal to +0.5%, less than or equal to +0.1%, or less than or equal to +0.05%. For example, two numerical values can be deemed to be "substantially" the same or equal if a difference between the values is less than or equal to +10% of an average of the values, such as less than or equal to +5%, less than or equal to +4%, less than or equal to +3%, less than or equal to +2%, less than or equal to +1%, less than or equal to +0.5%, less than or equal to +0.1%, or less than or equal to +0.05%. For example, "substantially" parallel can refer to a range of angular variation relative to 0° that is less than or equal to +10°, such as less than or equal to +5°, less than or equal to +4°, less than or equal to +3°, less than or equal to +2°, less than or equal to #1°, less than or equal to +0.5°, less than or equal to +0.1°, or less than or equal to +0.05°. For example, "substantially" perpendicular can refer to a range of angular variation relative to 90° that is less than or equal to +10°, such as less than or equal to +5°, less than or equal to +4°, less than or equal to +3°, less than or equal to +2°, less than or equal to +1°, less than or equal to +0.5°, less than or equal to +0.1°, or less than or equal to =0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangements thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:

a circuit structure;

an interconnection structure disposed over the circuit structure;

an antenna element disposed over the interconnection structure, wherein the antenna element defines a first recess having a sidewall; and a bonding material disposed in the first recess and climbing over the sidewall of the first recess of the antenna element, wherein the sidewall of the first recess of the antenna element and the bonding material are configured to feed a signal to the antenna element and is electrically connected to the interconnection structure.

2. The electronic device of claim 1, wherein the antenna element includes a base portion, and an extension tapering from the base portion toward the interconnection structure and defining the first recess, and wherein a width of the first recess is greater than a width of the interconnection structure.

3. The electronic device of claim 1, further comprising:

an encapsulant surrounding the interconnection structure, wherein the encapsulant defines a second recess exposing an upper surface of the interconnection structure, and wherein a surface area of a bottom surface of the second recess is greater than a surface area of the upper surface of the interconnection structure.

4. The electronic device of claim 3, further comprising:

a cover supporting the antenna element and spaced apart from the encapsulant, wherein the cover includes a base portion, and an extension tapering from the base portion toward the encapsulant.

5. The electronic device of claim 4, wherein the cover defines an air cavity between the antenna element and the encapsulant, and the air cavity functions as a resonant cavity for an electromagnetic (EM) wave.

6. The electronic device of claim 3, wherein the bonding material contacts the bottom surface of the second recess.

7. The electronic device of claim 1, wherein the bonding material has a curved lateral surface from a cross sectional view.

8. The electronic device of claim 1, further comprising:

an encapsulant surrounding the interconnection structure, wherein the encapsulant has a top surface facing toward the antenna element and a lateral surface; and a cover contacting the top surface of the encapsulant and spaced apart from the lateral surface of the encapsulant by an air gap.

9. The electronic device of claim 8, further comprising:

an adhesive layer filled in an opening of the cover penetrating through the cover.

10. The electronic device of claim 8, further comprising:

an adhesive layer disposed between the cover and the top surface of the encapsulant.

11. An electronic device, comprising:

an antenna pattern defining a first recess having a sidewall;

a package structure disposed under the antenna pattern; and a bonding material disposed in the first recess and in contact with the sidewall of the first recess of the antenna pattern, wherein the bonding material is electrically connected with the antenna pattern and the package structure, wherein the bonding material comprises a soldering material conformally disposed along the sidewall of the first recess of the antenna pattern.

12. The electronic device of claim 11, further comprising:

a cover defining an air cavity between the antenna pattern and the package structure, wherein the cover includes a first extension, and the antenna pattern has a second extension extending along the first extension and constituting the first recess.

13. The electronic device of claim 12, wherein the package structure includes an encapsulant having a second recess and an interconnection structure at least partially exposed by the encapsulant, wherein a portion of the bonding material is disposed within the second recess and electrically connects the antenna pattern and the interconnection structure.

14. The electronic device of claim 13, wherein the bonding material covers a lower edge of the second extension of the antenna pattern.

15. The electronic device of claim 12, wherein the first extension and the second extension are disposed in the air cavity.

16. An electronic device, comprising:

a package structure including an electronic component;

an antenna component supported by the package structure, where the antenna component at least partially covers a first lateral surface of the package structure and has an antenna pattern defining a recess having a sidewall; and a bonding material disposed in the recess and climbing over the sidewall of the recess of the antenna pattern, wherein the sidewall of the recess of the antenna pattern and the bonding material are configured to feed a signal to the antenna pattern and is electrically connected to the electronic component.

17. The electronic device of claim 16, wherein the antenna component includes a cover having a first portion extending along the first lateral surface of the package structure and spaced apart from the first lateral surface of the package structure by an air gap.

18. The electronic device of claim 17, wherein the cover includes a second portion extending along a second lateral surface opposite to the first lateral surface of the package structure, wherein a distance between the first portion of the cover and the first lateral surface of the package structure is different from a distance between the second portion of the cover and the second lateral surface of the package structure.

19. The electronic device of claim 17, wherein the antenna pattern has an extension extending along an internal sidewall of the cover and defining the recess.

* * * * *